US012718300B2

(12) United States Patent
Diao et al.

(10) Patent No.: US 12,718,300 B2
(45) Date of Patent: Aug. 25, 2026

(54) METHODS, SYSTEMS, AND COMPUTER PROGRAM PRODUCTS FOR FLAGGING DENTAL CLAIMS FOR FURTHER SCRUTINY BASED ON PROCESSING OF DENTAL CLINICAL IMAGES AND PERIODONTAL CHARTS USING MULTIPLE ARTIFICIAL INTELLIGENCE (AI) MODELS

(71) Applicant: Optum, Inc., Minnetonka, MN (US)

(72) Inventors: Qian Diao, San Jose, CA (US); Feili Yu, Shoreline, WA (US); Chenda Deng, Fort Collins, CO (US); Zelong Zhang, San Jose, CA (US); Letitia Murr, Charlotte, NC (US); Bo Han, Bothell, WA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/400,276

(22) Filed: Dec. 29, 2023

(65) Prior Publication Data

US 2025/0217893 A1 Jul. 3, 2025

(51) Int. Cl.
*G06Q 40/00* (2023.01)
*G06Q 40/08* (2012.01)
*G06T 7/00* (2017.01)

(52) U.S. Cl.
CPC ........... *G06Q 40/08* (2013.01); *G06T 7/0012* (2013.01); *G06T 2207/30036* (2013.01)

(58) Field of Classification Search
CPC .................. G06Q 40/08; G06T 7/0012; G06T 2207/30036
See application file for complete search history.

(56) References Cited

U.S. PATENT DOCUMENTS 7,077,647 B2 * 7/2006 Choi ........................ A61C 7/00 433/213
10,937,108 B1 * 3/2021 Tabak .................... G16H 30/20
(Continued)

FOREIGN PATENT DOCUMENTS

CA 3153131 A1 3/2021
CN 114730466 A 7/2022
(Continued)

OTHER PUBLICATIONS

Challenges of developing an automated dental identification system; 2003 46th Midwest Symposium on Circuits and Systems (vol. 1, 2003, pp. 411-414 vol. 1); M. Abdel-Mottaleb, O. Nomir, D.E. Nassar; G. Fahmy, H.H. Ammar; Jan. 1, 2003 . . . (Year: 2003).*
(Continued)

*Primary Examiner* — Tien C Nguyen
(74) *Attorney, Agent, or Firm* — MARSHALL, GERSTEIN & BORUN LLP

(57) ABSTRACT

A method includes receiving, by one or more processors, a clinical image associated with a dental procedure; identifying, by the one or more processors, one or more dental procedure codes based on processing the clinical image using a plurality of AI models; receiving, by the one or more processors, a periodontal chart image; processing, by the one or more processors, the periodontal chart image using optical character recognition to obtain pocket measurements associated with a plurality of teeth along with positional coordinates of each of the pocket measurements; identifying, by the one or more processors, a submitted dental procedure code in a dental claim for the dental procedure; determining, by the one or more processors, whether the submitted dental procedure code corresponds to a visibly detectable procedure; determining, by the one or more processors, whether the submitted dental procedure code matches any of the one or more dental procedure codes (Continued)

based on processing the clinical image when the submitted dental procedure code corresponds to a visibly detectable procedure; and flagging, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

20 Claims, 16 Drawing Sheets

(56) References Cited

U.S. PATENT DOCUMENTS 11,189,028 B1 11/2021 Kearney et al.
11,217,350 B2 1/2022 Kearney et al.
11,311,247 B2 4/2022 Kearney et al.
11,348,237 B2 5/2022 Kearney et al.
11,357,604 B2 6/2022 Kearney et al.
11,366,985 B2 6/2022 Kearney et al.
11,367,188 B2 6/2022 Kearney et al.
11,398,013 B2 7/2022 Kearney et al.
11,645,746 B2 5/2023 Abraham et al.
11,694,418 B2 7/2023 Long et al.
11,707,180 B2 7/2023 Falkel
11,776,677 B2 10/2023 Tabak et al.
11,963,846 B2 4/2024 Inam et al.
11,995,839 B2 5/2024 Weiss et al.
12,062,180 B2 8/2024 Weiss et al.
12,106,848 B2 10/2024 Inam et al.
12,127,814 B2 10/2024 Elbaz et al.
12,154,243 B2 11/2024 Cofar et al.
12,236,607 B2 2/2025 Weiss et al.
2008/0090207 A1* 4/2008 Rubbert ............. A61C 13/0004 433/172
2015/0294066 A1* 10/2015 Golay ...................... A61B 6/51 433/29
2016/0220196 A1* 8/2016 Stapleton .............. A61B 5/1111
2020/0175678 A1 6/2020 Abraham et al.
2020/0364624 A1 11/2020 Kearney et al.
2020/0364860 A1* 11/2020 Kearney .............. A61B 5/7267
2020/0372301 A1 11/2020 Kearney et al.
2020/0387829 A1 12/2020 Kearney et al.
2020/0405242 A1 12/2020 Kearney et al.
2020/0411167 A1 12/2020 Kearney et al.
2020/0411201 A1 12/2020 Kearney et al.
2021/0059796 A1 3/2021 Weiss et al.
2021/0100642 A1 4/2021 Weiss et al.
2021/0100643 A1 4/2021 Weiss et al.
2021/0106229 A1* 4/2021 Van Der Poel ...... A61B 5/0062
2021/0118099 A1 4/2021 Kearney et al.
2021/0118129 A1 4/2021 Kearney et al.
2021/0118132 A1 4/2021 Kearney et al.
2021/0338387 A1* 11/2021 Inam ..................... G06T 7/0012
2021/0343400 A1 11/2021 Inam et al.
2021/0353393 A1 11/2021 Kearney et al.
2021/0357688 A1 11/2021 Kearney et al.
2021/0358123 A1 11/2021 Kearney et al.
2021/0358604 A1 11/2021 Kearney et al.
2021/0365736 A1 11/2021 Kearney et al.
2022/0012815 A1* 1/2022 Kearney .............. G06N 3/0475
2022/0180447 A1* 6/2022 Kearney ................ G06N 3/045
2022/0202295 A1 6/2022 Elbaz et al.
2022/0215928 A1 7/2022 Tabak et al.
2022/0296344 A1 9/2022 Lee et al.
2023/0048898 A1 2/2023 Cofar et al.
2023/0281944 A1* 9/2023 Wu ........................... G06T 5/50 382/296
2023/0309800 A1 10/2023 Farkash et al.
2023/0419631 A1 12/2023 Ezhov et al.
2024/0046456 A1 2/2024 Suri et al.
2024/0122463 A1 4/2024 Li et al.
2024/0164874 A1 5/2024 Lipnik et al.
2024/0189078 A1 6/2024 Cramer et al.
2024/0274264 A1 8/2024 Tabak et al.
2024/0354960 A1 10/2024 Weiss et al.
2025/0037834 A1 1/2025 Ng et al.
2025/0054259 A1 2/2025 Cofar et al.
2025/0054261 A1 2/2025 Cofar et al.
2025/0072757 A1 3/2025 Elbaz et al.
2025/0099061 A1 3/2025 Kolli et al.
2025/0104234 A1 3/2025 Kolli et al.
2025/0104868 A1 3/2025 Kolli et al.
2025/0152015 A1 5/2025 Moshe et al.
2025/0160616 A1 5/2025 Michou et al.
2025/0226097 A1 7/2025 Fesharaki et al.

FOREIGN PATENT DOCUMENTS

CN 115884727 A 3/2023
CN 116723789 A 9/2023
CN 117152507 B 5/2024
CN 118541110 A 8/2024
CN 118799857 A 10/2024
CN 118974841 A 11/2024
CN 119053988 A 11/2024
CN 118799858 B 12/2024
CN 119604900 A 3/2025
JP 2024546475 A 12/2024
KR 20220056234 A 5/2022
KR 20240155185 A 10/2024
KR 10-2826686 B1 7/2025
KR 10-2826695 B1 7/2025
WO WO-2021/046147 A1 3/2021
WO WO-2021/046434 A1 3/2021
WO WO-2022/011342 A1 1/2022
WO WO-2022/147160 A1 7/2022
WO WO-2022/150821 A1 7/2022
WO WO-2022/011342 A9 11/2022
WO WO-2023/009859 A2 2/2023
WO WO-2023/156447 A1 8/2023
WO WO-2024/124054 A1 6/2024
WO WO-2025/038581 A1 2/2025
WO WO-2025/067852 A1 4/2025
WO WO-2025/072374 A1 4/2025

OTHER PUBLICATIONS

U.S. Appl. No. 18/183,518, filed Mar. 14, 2023.
Non-Final Office Action issued Jul. 22, 2025 for U.S. Appl. No. 18/183,518.

* cited by examiner 905
900

METHODS, SYSTEMS, AND COMPUTER PROGRAM PRODUCTS FOR FLAGGING DENTAL CLAIMS FOR FURTHER SCRUTINY BASED ON PROCESSING OF DENTAL CLINICAL IMAGES AND PERIODONTAL CHARTS USING MULTIPLE ARTIFICIAL INTELLIGENCE (AI) MODELS

FIELD

The present disclosure relates generally to health care systems and services and, more particularly, to processing attachments to a dental claim for medical necessity adjudication and further scrutiny of the dental claim.

BACKGROUND

A significant portion of dental procedures that are performed require one or more attachments to accompany a claim that is submitted to a dental care payment plan administrator, e.g., a private insurance entity, government insurance entity, and/or a medical expense sharing organization, which may be referred to as a "payor," for payment. The one or more attachments are intended to provide evidentiary support of the medical necessity for the procedures for which reimbursement is sought. These procedures account for a relatively large portion of the total amount of payor reimbursements. The procedures are typically coded using a code set called Current Dental Terminology (CDT), which defines a code set with associated descriptive terms for reporting dental services and procedures to payors that provide dental benefits plans. The CDT codes may be based on the procedure types, e.g., crown, filing, etc., the type of material used in the procedure, e.g., gold, silver amalgam, composite, etc., and/or the number of tooth surfaces that are affected. The attachments included with a claim, which may include, but are not limited to, dental radiology with patient X-ray images to illustrate dental anatomy and pathology, clinical photos as evidence of a performed procedure, and periodontal charts that record details of clinical observation by dental professionals, may be difficult for a claim adjudicator to determine if these attachments provide the evidentiary support for the procedures identified in the claim. The most common attachment used for procedure verification is an X-ray, but due to the limitations of X-rays with respect to color and spatial information, additional documentation is often required to provide the evidentiary support for a number of dental services or procedures. Moreover, the manual adjudication process is labor-intensive and the adjudicators may need to possess professional licenses to apply expertise in dentistry to interpret the various attachments. As a result, the cost incurred by the low efficiency and efficacy of the adjudication process may be less than a payor and/or provider desires. In some instances where the value of the claim is relatively low, the adjudication process may be skipped resulting in a payor reimbursing some procedures that did not have the proper medical necessity evidentiary support.

In the health care industry it is estimated that around 3% of total spending is a result of fraudulent billing. Common frauds in dental claims include, for example, billing for services/procedures that are not performed and performing services/procedures that are not necessary. Due to difficulties in the dental claim adjudication process, detecting fraud in dental claims is a manual process that can be expensive and inefficient. Moreover, as noted above, X-ray radiographs and periodontal charts are the most common attachment mandated by payors for dental procedure verification, but key information that can be used to verify if a procedure is performed can only be found in clinical photos, such as exterior features of a tooth. Missing such information can increase the propensity for error in adjudicating a dental claim.

SUMMARY

According to some embodiments of the disclosure, a computer-implemented method comprises: receiving, by one or more processors, a clinical image associated with a dental procedure; processing the clinical image by the one or more processors and a plurality of Artificial Intelligence (AI) models, a first one of the AI models being trained using procedure type information, a second one of the plurality of AI models being trained using material type information, and a third one of the plurality of AI models being trained using tooth surface information; identifying, by the one or more processors, one or more dental procedure codes based on processing the clinical image using the plurality of AI models; receiving, by the one or more processors, a periodontal chart image; processing, by the one or more processors, the periodontal chart image using optical character recognition to obtain pocket measurements associated with a plurality of teeth along with positional coordinates of each of the pocket measurements; applying, by the one or more processors, layout rules associated with the periodontal chart image to identify which respective ones of the pocket measurements correspond to which respective ones of the plurality of teeth; storing, by the one or more processors, the pocket measurements in a computer-readable construct having a specified data format that preserves relationships between the respective ones of the pocket measurements and the respective one of the plurality of teeth; identifying, by the one or more processors, a submitted dental procedure code in a dental claim for the dental procedure; determining, by the one or more processors, whether the submitted dental procedure code corresponds to a visibly detectable procedure; determining, by the one or more processors, whether the submitted dental procedure code matches any of the one or more dental procedure codes based on processing the clinical image when the submitted dental procedure code corresponds to a visibly detectable procedure; and flagging, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

In other embodiments, processing the clinical image using the first one of the AI models comprises: identifying, by the one or more processors, at least one tooth in the clinical image; and determining, by the one or more processors, at least one procedure type associated with the at least one tooth in the clinical image; wherein the at least one procedure type is a crown procedure, a filling procedure, an inlay procedure, or an onlay procedure.

In still other embodiments, processing the clinical image using the second one of the AI models comprises: identifying, by the one or more processors, at least one tooth in the clinical image; and determining, by the one or more processors, at least one material type used in a procedure for the at least one tooth.

In still other embodiments, the at least one material type is amalgam, base metal, gold, metallic, noble metal, resin, porcelain, and stainless steel.

In still other embodiments, processing the clinical image using the third one of the plurality of AI models comprises: identifying, by the one or more processors, at least one tooth in the clinical image; and identifying, by the one or more processors, at least one surface on the at least one tooth associated with the dental procedure.

In still other embodiments, processing the clinical image using the plurality of AI models comprises: identifying, by the one or more processors, at least one tooth in the clinical image via a first bounding box using the first one of the AI models; determining, by the one or more processors, at least one procedure type associated with the at least one tooth in the clinical image using the first one of the AI models; identifying, by the one or more processors, at least one tooth in the clinical image via a second bounding box using the second one of the AI models; determining, by the one or more processors, at least one material type used in a procedure for the at least one tooth using the second one of the AI models; identifying, by the one or more processors, at least one tooth in the clinical image via a third bounding box using the third one of the AI models; and identifying, by the one or more processors, at least one surface on the at least one tooth associated with the dental procedure using the third one of the AI models.

In still other embodiments, the method further comprises: overlaying, by the one or more processors, the first, second, and third bounding boxes with each other to generate a two-dimensional overlay shape; determining, by the one or more processors, a ratio of an area of common overlap between the first, second, and third bounding boxes to a total surface area of the two-dimensional overlap shape; and generating, by the one or more processors, a commonality confidence score based on the ratio.

In still other embodiments, identifying the one or more dental procedure codes based on processing the clinical image using the plurality of AI models comprises: identifying, by the one or more processors, the one or more dental procedure codes based on determining the at least one procedure type using the first one of the AI models, determining the at least one material type using the second one of the AI models, identifying the at least one surface using the third one of the AI models, and the commonality confidence score.

In still other embodiments, the one or more dental procedure codes comprise one or more Current Dental Terminology (CDT) codes.

In still other embodiments, the method further comprises: applying, by the one or more processors, layout rules associated with the periodontal chart image to associate one or more measurement names with the pocket measurements; applying, by the one or more processors, layout rules associated with the periodontal chart image to associate one or more measurement dates with the pocket measurements; and applying, by the one or more processors, layout rules associated with the periodontal chart image to identify a tooth location for each of the pocket measurements; wherein storing the pocket measurements comprises: storing, by the one or more processors, the pocket measurements in a computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements; wherein the tooth location is facial, lingual, or buccal.

In still other embodiments, the layout rules specify that row coordinates are used to differentiate the pocket measurements for different ones of the plurality of teeth; the layout rules specify that the one or more measurement names have similar column coordinates; the layout rules specify that the one or more measurement dates have similar column coordinates; and the layout rules specify that ones of the pocket measurements corresponding to a same one of the plurality of teeth have similar column coordinates.

In still other embodiments, the layout rules specify that ones of the pocket measurements corresponding to teeth 1-16 in the facial location are in a first quarter section of the periodontal chart image as defined by column coordinates; the layout rules specify that ones of the pocket measurements corresponding to teeth 1-16 in the lingual location are in a second quarter section of the periodontal chart image as defined by column coordinates; the layout rules specify that ones of the pocket measurements corresponding to teeth 32-17 in the lingual location are in a third quarter section of the periodontal chart image as defined by column coordinates; and the layout rules specify that ones of the pocket measurements corresponding to teeth 32-17 in the facial location are in a fourth quarter section of the periodontal chart image as defined by column coordinates.

In still other embodiments, the method further comprises: enhancing, by the one or more processors, the periodontal chart image prior to processing the periodontal chart image using optical character recognition; wherein enhancing the periodontal chart image comprises: removing, by the one or more processors, extraneous information from the periodontal chart image; normalizing, by the one or more processors, the background of the periodontal chart image; changing, by the one or more processors, one or more font colors used in the periodontal chart image; or changing, by the one or more processors, one or more font sizes used in the periodontal chart image.

In still other embodiments, the method further comprises: identifying, by the one or more processors, column boundaries in the periodontal chart image, each of the columns in the periodontal chart image being associated with a unique pair of the plurality of teeth; wherein identifying, by the one or more processors, the column boundaries in the periodontal chart image comprises: identifying, by the one or more processors, the column boundaries in the periodontal chart image using image segmentation when the periodontal chart image includes column separator indicia; and deriving, by the one or more processors, the column boundaries using optical character recognition coordinates when the periodontal chart images does not include column separator indicia.

In still other embodiments, the computer-readable construct having the specified data format is a JavaScript Object Notation (JSON) string.

In still other embodiments, the method further comprises: determining, by the one or more processors, whether a maximum one of the pocket measurements satisfies a poor tooth health threshold; and wherein flagging the dental claim when the submitted dental procedure code does not correspond to a visibly detectable procedure comprises: flagging, by the one or more processors, the dental claim when the submitted dental procedure code does not correspond to a visibly detectable procedure and the maximum one of the pocket measurements does not satisfy the poor tooth health threshold.

In some embodiments of the disclosure, a system comprises: one or more processors; and a memory coupled to the one or more processors and comprising computer readable program code embodied in the memory that is executable by the one or more processors to perform operations comprising: receiving, by the one or more processors, a clinical image associated with a dental procedure; processing the clinical image by the one or more processors and a plurality of Artificial Intelligence (AI) models, a first one of the AI models being trained using procedure type information, a second one of the plurality of AI models being trained using material type information, and a third one of the plurality of AI models being trained using tooth surface information; identifying, by the one or more processors, one or more dental procedure codes based on processing the clinical image using the plurality of AI models; receiving, by the one or more processors, a periodontal chart image; processing, by the one or more processors, the periodontal chart image using optical character recognition to obtain pocket measurements associated with a plurality of teeth along with positional coordinates of each of the pocket measurements; applying, by the one or more processors, layout rules associated with the periodontal chart image to identify which respective ones of the pocket measurements correspond to which respective ones of the plurality of teeth; storing, by the one or more processors, the pocket measurements in a computer-readable construct having a specified data format that preserves relationships between the respective ones of the pocket measurements and the respective one of the plurality of teeth; identifying, by the one or more processors, a submitted dental procedure code in a dental claim for the dental procedure; determining, by the one or more processors, whether the submitted dental procedure code corresponds to a visibly detectable procedure; determining, by the one or more processors, whether the submitted dental procedure code matches any of the one or more dental procedure codes based on processing the clinical image when the submitted dental procedure code corresponds to a visibly detectable procedure; and flagging, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

In further embodiments, the operations further comprise: determining, by the one or more processors, whether a maximum one of the pocket measurements satisfies a poor tooth health threshold; and wherein flagging the dental claim when the submitted dental procedure code does not correspond to a visibly detectable procedure comprises: flagging, by the one or more processors, the dental claim when the submitted dental procedure code does not correspond to a visibly detectable procedure and the maximum one of the pocket measurements does not satisfy the poor tooth health threshold.

In some embodiments of the disclosure, a computer program product, comprises: one or more non-transitory computer readable storage media including instructions that, when executed by one or more processors, cause the one or more processors to: receive, by the one or more processors, a clinical image associated with a dental procedure; process the clinical image by the one or more processors and a plurality of Artificial Intelligence (AI) models, a first one of the AI models being trained using procedure type information, a second one of the plurality of AI models being trained using material type information, and a third one of the plurality of AI models being trained using tooth surface information; identify, by the one or more processors, one or more dental procedure codes based on processing the clinical image using the plurality of AI models; receive, by the one or more processors, a periodontal chart image; process, by the one or more processors, the periodontal chart image using optical character recognition to obtain pocket measurements associated with a plurality of teeth along with positional coordinates of each of the pocket measurements; apply, by the one or more processors, layout rules associated with the periodontal chart image to identify which respective ones of the pocket measurements correspond to which respective ones of the plurality of teeth; store, by the one or more processors, the pocket measurements in a computer-readable construct having a specified data format that preserves relationships between the respective ones of the pocket measurements and the respective one of the plurality of teeth; identify, by the one or more processors, a submitted dental procedure code in a dental claim for the dental procedure; determine, by the one or more processors, whether the submitted dental procedure code corresponds to a visibly detectable procedure; determine, by the one or more processors, whether the submitted dental procedure code matches any of the one or more dental procedure codes based on processing the clinical image when the submitted dental procedure code corresponds to a visibly detectable procedure; and flag, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

In other embodiments, the instructions, when executed by the one or more processors, further cause the one or more processors to: determine, by the one or more processors, whether a maximum one of the pocket measurements satisfies a poor tooth health threshold; and wherein flag the dental claim when the submitted dental procedure code does not correspond to a visibly detectable procedure comprises: flag, by the one or more processors, the dental claim when the submitted dental procedure code does not correspond to a visibly detectable procedure and the maximum one of the pocket measurements does not satisfy the poor tooth health threshold.

Other methods, systems, articles of manufacture, and/or computer program products according to embodiments of the disclosure will be or become apparent to one with skill in the art upon review of the following drawings and detailed description. It is intended that all such additional systems, methods, articles of manufacture, and/or computer program products be included within this description, be within the scope of the present inventive subject matter and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
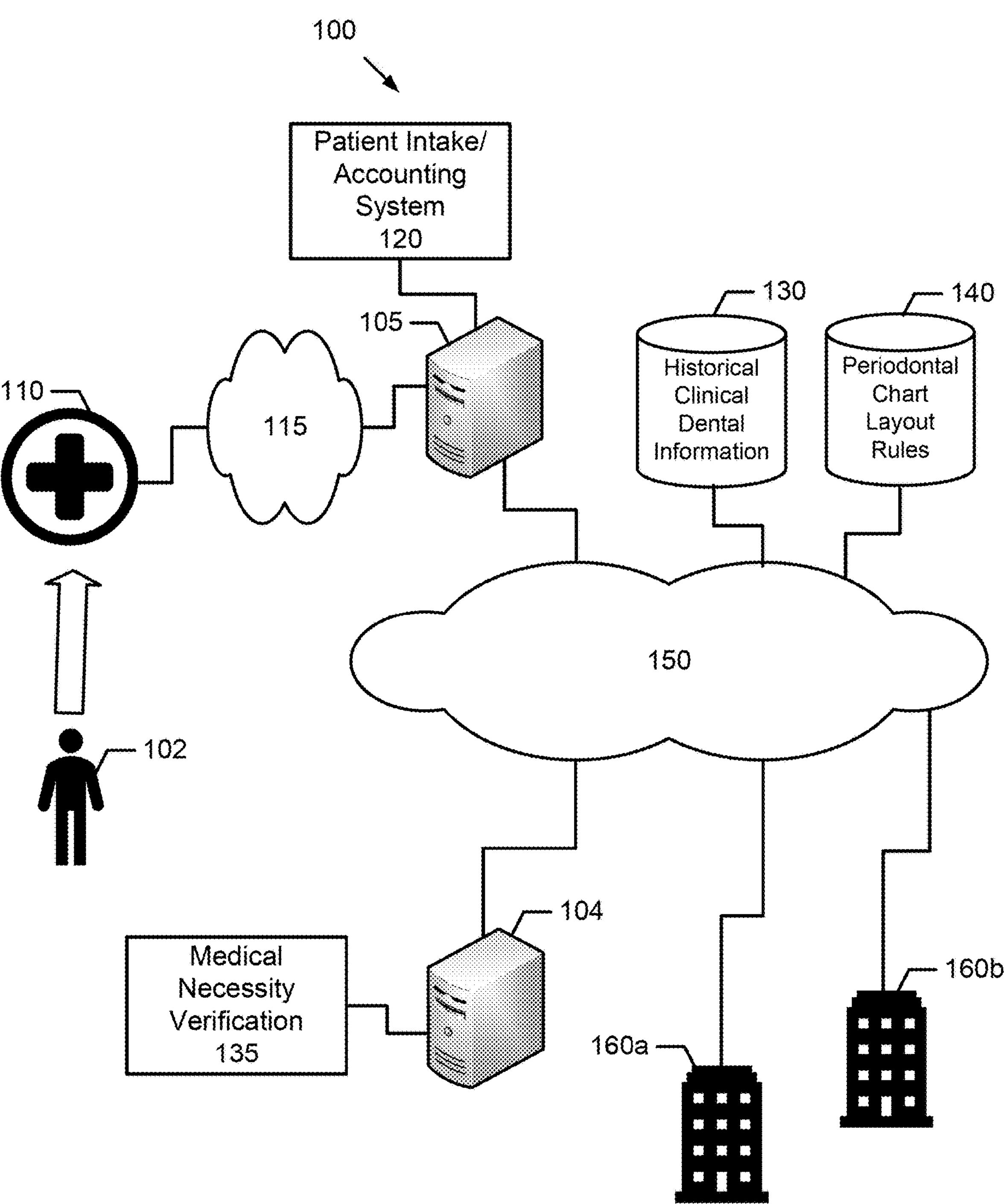
FIG. 1 is a block diagram that illustrates a communication network including an Artificial Intelligence (AI) based decision support system for flagging dental claims for further scrutiny in accordance with some embodiments of the disclosure.

In the following detailed description, numerous specific details are set forth to provide a thorough understanding of embodiments of the disclosure. However, it will be understood by those skilled in the art that embodiments of the disclosure may be practiced without these specific details. In some instances, well-known methods, procedures, components, and circuits have not been described in detail so as not to obscure the disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "provider" may mean any person or entity involved in providing health care products and/or services to a patient.

Embodiments of the disclosure are described herein in the context of a dental procedure code verification system that includes one or more Artificial Intelligence (AI) engines for processing dental clinical images to identify dental procedure codes. The AI engines or models of the dental procedure code verification system may be embodied in a variety of different ways including, but not limited, one or more multi-layer neural networks, a machine learning system, a deep learning system, a natural language processing system, and/or computer vision system. Moreover, it will be understood that the multi-layer neural network is a multi-layer artificial neural network comprising artificial neurons or nodes and does not include a biological neural network comprising real biological neurons. The AI engines or models described herein may be configured to transform a memory of a computer system to include one or more data structures, such as, but not limited to, arrays, extensible arrays, linked lists, binary trees, balanced trees, heaps, stacks, and/or queues. These data structures can be configured or modified through the AI training process to improve the efficiency of a computer system when the computer system operates in an inference mode to make an inference, prediction, classification, suggestion, or the like with respect to processing dental clinical images to identify dental procedure codes associated therewith.

Some embodiments of the disclosure stem from a realization that X-rays, while they are one of the most common dental claim attachments used for evidentiary support for dental procedures, they have some limitations with respect to color and spatial information. As a result, the manual adjudication of dental claims including X-ray attachments can be labor-intensive and may require significant knowledge of dental science. Moreover, the manual evaluation of X-ray attachments may result in various steps being skipped due to missing evidence. For example, X-ray images do not show how many surfaces of a tooth are impacted by a filling because an X-ray image lacks three-dimensional information. It is also difficult to recognize the colors and the texture of materials from an X-ray image. Without this type of information, many types of procedures may not pass a medical necessity review because the supporting evidence cannot be gleaned from the X-ray attachments. Some embodiments of the disclosure may provide a multiple AI model framework in which each model is trained to evaluate one or more clinical images associated with a dental procedure. A first model may be trained to detect a procedure type from the clinical image(s), a second model may be trained to detect a material type from the clinical image(s), and/or a third model may be trained to detect tooth surface information from the clinical image(s). These models may run in parallel and may be independent of one another to generate individual prediction outputs. The output from each model may include a prediction as well as a bounding box associated with the relevant tooth. The predictions may be bound together based on the overlap of the different bounding boxes. One or more dental procedure codes, e.g., Current Dental Terminology (CDT) codes, may be identified based on the outputs of the different AI models. The use of clinical images to identify dental procedure codes may increase the effectiveness of the payors dental claim adjudication process as the clinical images may provide evidentiary support for various procedures that X-rays cannot provide. Moreover, the automation of the procedure code identification based on clinical images may be more accurate and less labor intensive than a manual adjudication of the images. It will be further understood that while example embodiments of the disclosure are described herein with respect to the use of multiple AI models for processing a clinical image to determine if the image provides various evidentiary support for a dental procedure category or code, these models may be further combined with additional types of AI technology, such as a Natural Language Processing (NLP) engine, which may analyze and read text contained in a patient's medical history, periodontal chart, dental professional's notes, and the like to determine if this text information can be associated with and provides evidentiary support for one or more procedure categories or codes.

Periodontal charts are also frequently attached to dental claims and submitted to payors for reimbursement. The periodontal charts are typically manually processed by adjudicators who need to find the corresponding tooth identified in the body of the claim, extract the pocket depth measurements from the periodontal chart for that tooth, and determine whether these measurements support, e.g., provide medical necessity evidence for, one or more procedures identified in the body of the claim. The periodontal chart, however, is often dense with information, and the information contained therein is often written with small fonts, which may make the payors adjudication process slow and error prone. Some embodiments of the inventive concept may provide a periodontal chart processing system that can extract the teeth and pocket measurement information contained therein and store this information in a computer-readable construct having a specified data format, such as a JavaScript Object Notation (JSON) string, that preserves the relationships between the pocket measurements and the teeth. Layout rules associated with the periodontal chart may identify which pocket measurements correspond to which teeth and may also identify the locations of measurement names, measurement dates, and teeth locations within the periodontal chart. As the periodontal chart information is converted into a construct that can be readily processed using a computer, the amount of manual review of the periodontal chart information during claim adjudication by a payor may be reduced.

Some embodiments of the inventive concept may provide a decision support system that may use dental procedure codes identified and output from one or more AI models used to process the one or more clinical images along with the processed periodontal chart to predict whether a dental claim should be flagged for further scrutiny, such as, for example, when the claim may be suspicious or fraudulent. When a claim includes a procedure code that is visually detectable, i.e., it is associated with a procedure that can show a visible exterior change to an affected tooth, then a determination will be made whether that procedure code was output from the AI models processing the one or more clinical images. If the procedure code was not output from the processing of the clinical images, then the decision support system may predict that the claim should be flagged. When a claim includes a procedure code that is not visually detectable, such as a procedure code for a deep cleaning, then one or more of the pocket measurements from the processed periodontal chart may be used to evaluate whether a procedure identified in the procedure code in the claim has sufficient evidentiary support to satisfy a medical necessity review. In some embodiments, the maximum pocket depths for one or more of the teeth may be used in the medical necessity evaluation. If the one or more pocket measurements do not satisfy a poor tooth health threshold for the procedure associated with the procedure code in the claim, then the decision support system may predict that the claim should be flagged.

Referring to FIG. 1, a communication network 100 including a decision support system for detecting, in accordance with some embodiments of the disclosure, comprises one or more dental care provider facilities or practices 110 that treat one or more patients 102. Each health care provider facility or practice may represent various types of organizations that are used to deliver dental care services to patients via health care professionals, which are referred to generally herein as "providers." The providers may include, but are not limited to, dental practices, mobile dental care facilities, oral surgery centers, diagnostic centers, lab centers, pharmacies, and the like. The providers may operate by providing dental care services for patients and then invoicing one or more payors 160*a* and 160*b* for the services rendered. The payors 160*a* and 160*b* may include, but are not limited to, providers of private insurance plans, providers of government insurance plans (e.g., Medicare, Medicaid, state, or federal public employee insurance plans), providers of hybrid insurance plans (e.g., Affordable Care Act plans), providers of private medical cost sharing plans, and the patients themselves. One provider facility 110 is illustrated in FIG. 1 with the provider including a patient intake/accounting system server 105 accessible via a network 115. The patient intake/accounting system server 105 may be configured with a patient intake/accounting system module 120 to manage the intake of patients for appointments and to generate invoices for payors for services and products rendered through the provider 110. The network 115 communicatively couples the patient intake/accounting system server 105 to other devices, terminals, and systems in the provider's facility 110. The network 115 may comprise one or more local or wireless networks to communicate with patient intake/accounting system server 105 when the patient intake/accounting system server 105 is located in or proximate to the dental care service provider facility 110. When the patient intake/accounting system server 105 is in a remote location from the health care facility, such as part of a cloud computing system or at a central computing center, then the network 115 may include one or more wide area or global networks, such as the Internet.

According to some embodiments of the disclosure, a decision support system server 104 may include a medical necessity verification module 135 that is configured to provide one or more AI engines or models. The one or more AI models are configured to receive one or more clinical images that may be included as attachments to a dental claim as evidentiary support for one or more procedures identified in the dental claim body. Each of the one or more AI models may be trained based on historical clinical dental information 130 associated with previously treated patients. Different ones of the one or more AI models may be trained differently, however. For example, a first model may be trained to detect a procedure type from the clinical image(s), a second model may be trained to detect a material type from the clinical image(s), and/or a third model may be trained to detect tooth surface information from the clinical image(s). As will be described with reference to FIG. 2, the AI models may run in parallel and may be independent of one another to generate individual prediction outputs. Their outputs may be associated with one another, i.e., verify that they correspond to the same tooth or group of teeth, through use of bounding boxes that are respectively output from each AI model along with the prediction. The prediction outputs of the one or more AI models may identify one or more dental procedure categories or codes, e.g., CDT codes, that the clinical image supports, i.e., provides evidentiary support that the procedure has been performed.

Figure 13:
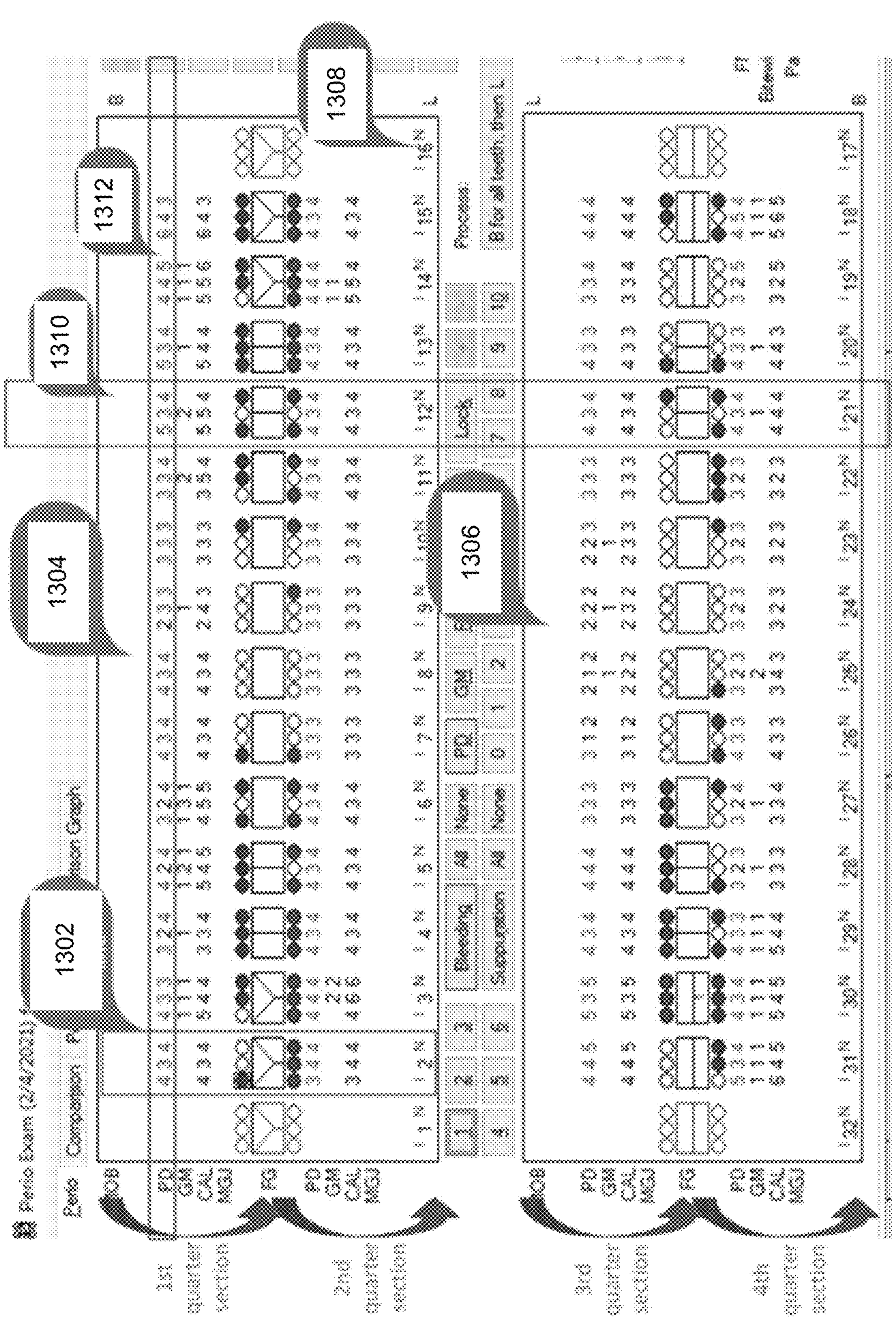
FIG. 13 is a diagram of a periodontal chart in accordance with some embodiments of the disclosure.

The medical necessity verification module 135 may be further configured to provide a multi-module periodontal chart processing engine that is configured to extract teeth and pocket information from the periodontal chart and store this information in a computer-readable construct that has a specified data format that preserves the relationships between the teeth and pocket information and supplemental information, such as measurement date, measurement name, and the like. The periodontal chart processing engine is configured to use layout rules for a periodontal chart, which are stored in the periodontal chart layout rules repository 140, for interpreting the information contained in a periodontal chart so that the relationships between the information may be preserved. The periodontal chart layout rules may provide an algorithmic map of where information, such as tooth number, pocket measurement data, measurement name(s), measurement date(s), and tooth location, e.g., facial, lingual, and buccal, are located. Referring now to FIG. 13, a periodontal chart may be configured with an upper part 1304 and a lower part 1306 with the upper part including a first quarter section and a second quarter section and the lower part including a third quarter section and a fourth quarter section. The upper part 1304 includes pocket depth measurement information for teeth 1-16 and the lower part 1306 includes pocket depth measurement information for teeth 17-32. For example, tooth 16 1308 is in the second quarter section of the upper part 1304 of the periodontal chart. The periodontal chart may be organized in columns with each column being the same width and having a unique set of two teeth therein—one in the upper part of the chart 1304 and one in the lower part of the chart 1306. In some periodontal charts the columns may be defined by a column separator 1302 while in other periodontal charts the columns 1310 may be undefined. The column separators 1302 may be used to identify the column boundaries in a periodontal chart image when present. When the periodontal chart does not include column separators 1302, a column 1310 boundary may be derived using optical character recognition coordinates. In the example of FIG. 13, the periodontal chart includes multiple measurement names PD, GM, CAL, and MGJ, which are organized by row 1312 and may correspond to different measurement dates. In the example of FIG. 13, specific measurement dates are not identified. The pocket measurements for each side of each tooth are organized by row 1312 with the location on the tooth being identified by a position within the column for the respective tooth.

A network 150 couples the patient intake/accounting system server 105 and payors 160*a*, 160*b* to the decision support system server 104. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The flagging detection service provided through the decision support system server 104 may, in some embodiments, be embodied as a cloud service. For example, dental care service providers 110 and/or payors 160*a*, 160*b* may access the procedure code verification system as a Web service. In some embodiments, the benefit discovery service may be implemented as a Representational State Transfer Web Service (RESTful Web service).

Although FIG. 1 illustrates an example communication network including a decision support system for flagging a claim for further scrutiny, such as predicting whether a dental claim is suspicious or fraudulent, it will be understood that embodiments of the inventive subject matter are not limited to such configurations, but are intended to encompass any configuration capable of carrying out the operations described herein.

Figure 2:
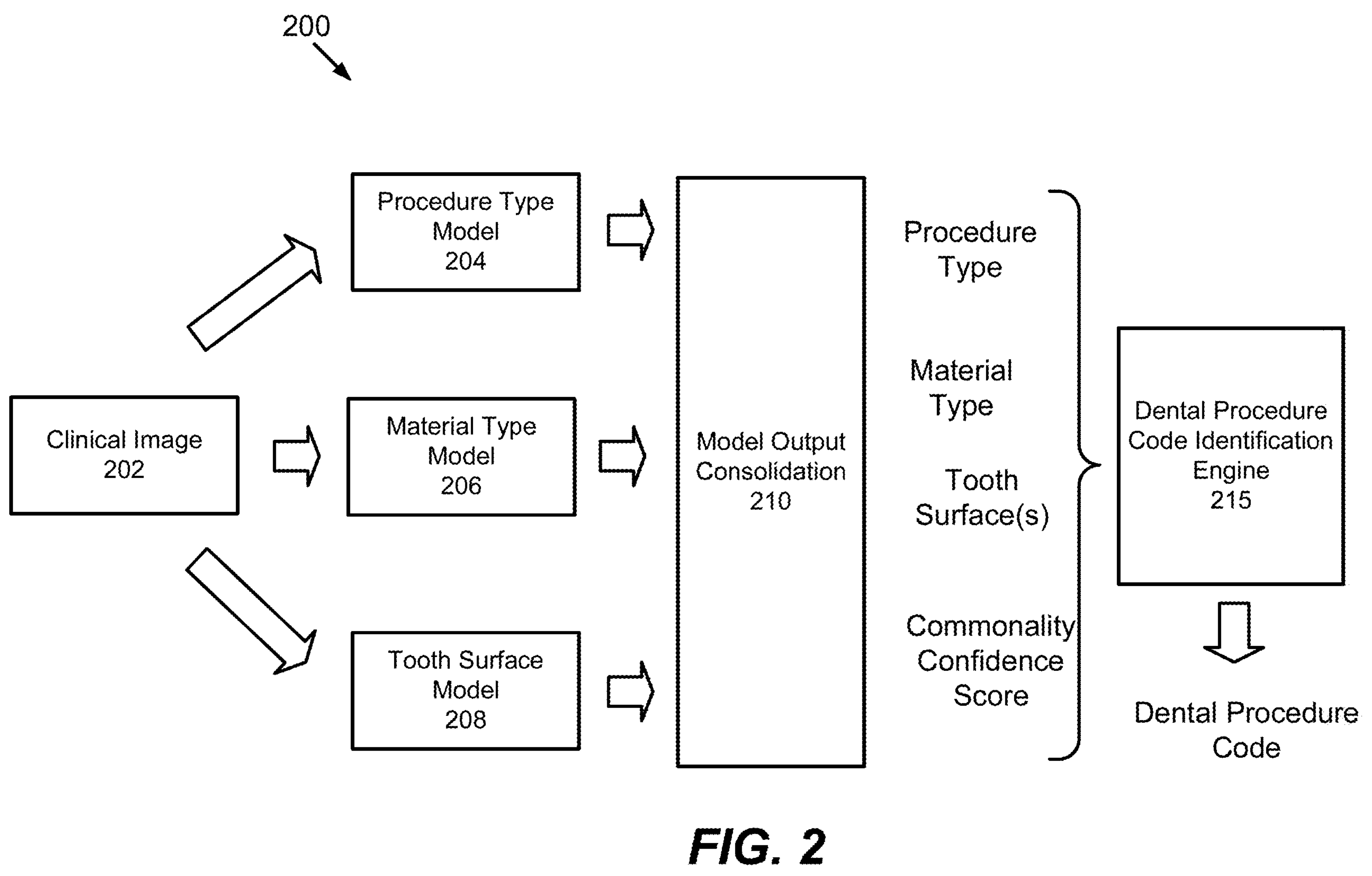
FIG. 2 is a block diagram that illustrates a dental procedure code verification system in accordance with some embodiments of the disclosure.

FIG. 2 is a block diagram that illustrates a dental procedure code verification system in accordance with some embodiments of the disclosure. As shown in FIG. 2, the dental procedure code verification system includes a plurality of modules that are coupled in pipeline fashion. The dental procedure code verification system 200 includes a plurality of AI models—a procedure type model 204, a material type model 206, and a tooth surface model 208—that are configured to receive a clinical image 202 for processing, such as a clinical image that may be attached to a dental claim. The clinical image 202 is received and processed independently by the three different AI models in parallel. As a result, the predictive outputs of each of the procedure type model 204, the material type model 206, and the tooth surface model 208 need to be consolidated. In addition to the procedure type prediction, material type prediction, and the number and/or identity of tooth surface prediction output from the procedure type model 204, the material type model 206, and the tooth surface model 208, respectively, the procedure type model 204, the material type model 206, and the tooth surface model 208 may each output a bounding box specifying the region of the image to which the prediction output pertains. The model output consolidation module 210 may be configured to generate a commonality confidence score based on the degree of overlap between the bounding boxes output from the different AI models. Based on the procedure type prediction, material type prediction, and the number and/or identity of tooth surface prediction output from the procedure type model 204, the material type model 206, and the tooth surface model 208, respectively, along with the commonality confidence score, the dental procedure code identification engine 215 may identify one or more dental procedure categories or codes, e.g., CDT codes, that the are supported, i.e., have evidentiary support, by the procedure type prediction, material type prediction, and the number and/or identity of tooth surface prediction. Note that if the commonality confidence score is low and a procedure category or code requires evidentiary support in multiple areas, e.g., both procedure type and material type, then a dental procedure category or code is unlikely to be identified even if the required procedure type and required material type are both output from the procedure type model 204 and the material type model 206. This may be because the procedure is detected for one tooth while the material is detected for a different tooth resulting in a relatively low commonality confidence score.

Figure 3:
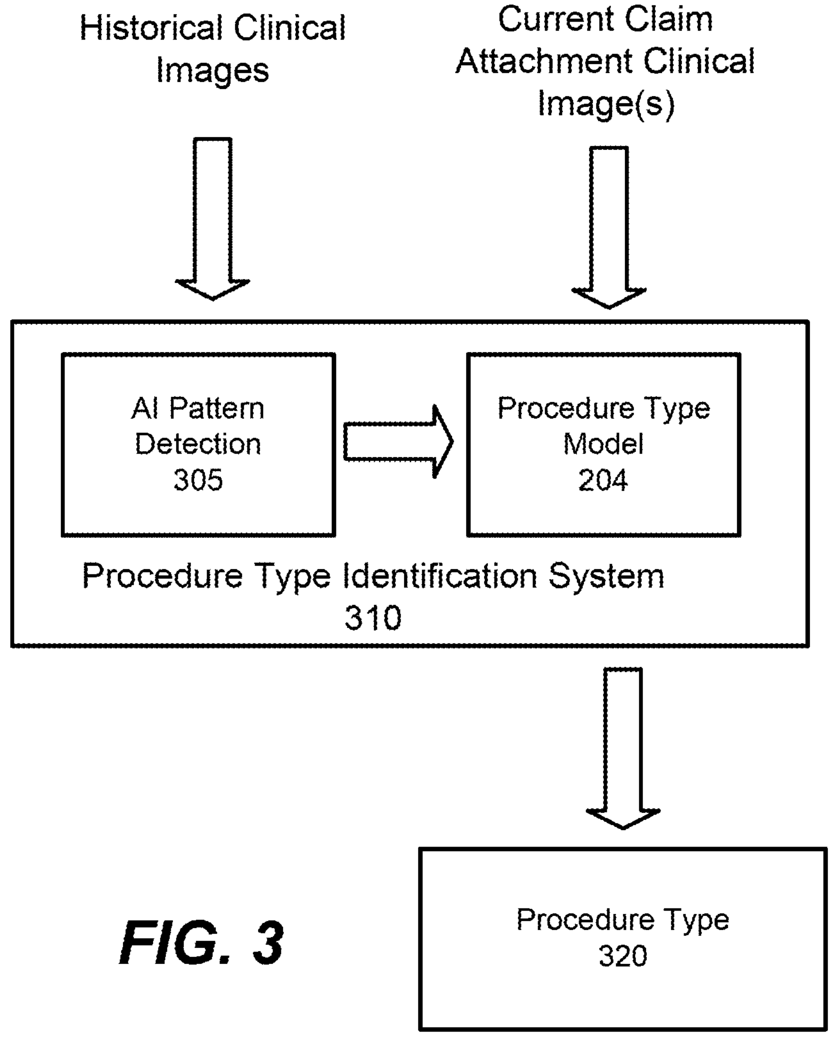
FIG. 3 is a block diagram of an AI based procedure type identification system in accordance with some embodiments of the disclosure.

FIG. 3 is a block diagram that illustrates embodiments of an AI based procedure type identification system 310 in which an AI engine is used to process current dental claim attachment images associated with a patient to predict a procedure type. Clinical dental attachments, such as clinical images, may contain features that provide indicia of one or more types of procedure categories or codes, e.g., CDT codes. The AI engine may include an AI pattern detection module 305 and the procedure type model 204. The AI pattern detection module 305 may be configured to receive historical clinical images associated with dental examinations of historical patients. During training, the AI pattern detection module 305 may learn associations between features of these clinical images and various types of dental procedures, e.g., procedure categories or codes. The AI pattern detection module 305 may then generate the procedure type model 204 based on these learned associations, which can be used to process current clinical images associated with a current patient. The procedure type identification system 310 may generate a predicted procedure type 320, which may further include one or more teeth associated with the predicted procedure type and a bounding box identifying the one or more teeth in the clinical image. In accordance with some embodiments of the disclosure, the procedure types may include, but are not limited to, a crown procedure, a filling procedure, an inlay procedure, and/or an onlay procedure.

Figure 4:
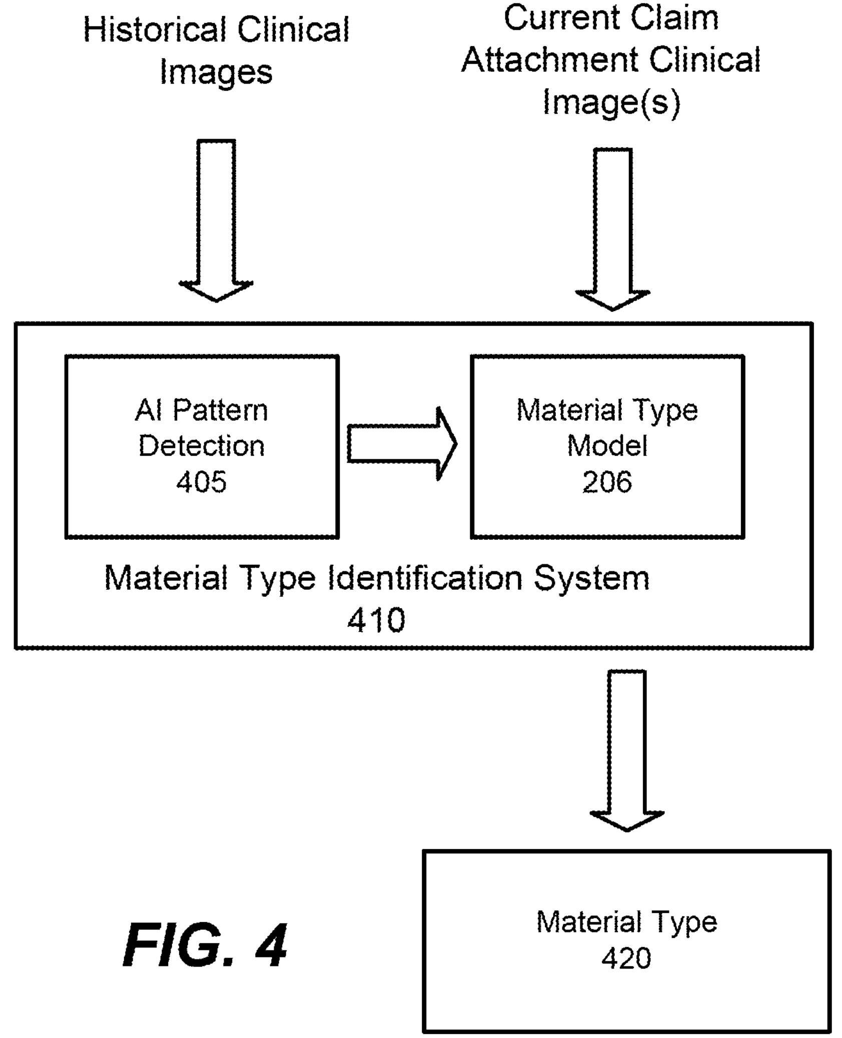
FIG. 4 is a block diagram of an AI based material type identification system in accordance with some embodiments of the disclosure.

FIG. 4 is a block diagram that illustrates embodiments of an AI based material type identification system 410 in which an AI engine is used to process current dental claim attachment images associated with a patient to predict a material type used in a procedure. Clinical dental attachments, such as clinical images, may contain features that provide indicia of one or more types of materials used in a procedure. The AI engine may include an AI pattern detection module 405 and the material type model 206. The AI pattern detection module 405 may be configured to receive historical clinical images associated with dental examinations of historical patients. During training, the AI pattern detection module 405 may learn associations between features of these clinical images and various types of materials used in dental procedures. The AI pattern detection module 405 may then generate the material type model 206 based on these learned associations, which can be used to process current clinical images associated with a current patient. The material type identification system 410 may generate a predicted material type 420, which may further include one or more teeth associated with the predicted material type and a bounding box identifying the one or more teeth in the clinical image. In accordance with some embodiments of the disclosure, the material types may include, but are not limited to, an amalgam, a base metal, gold, a metallic material, a noble metal, a resin, porcelain, and/or stainless steel.

Figure 5:
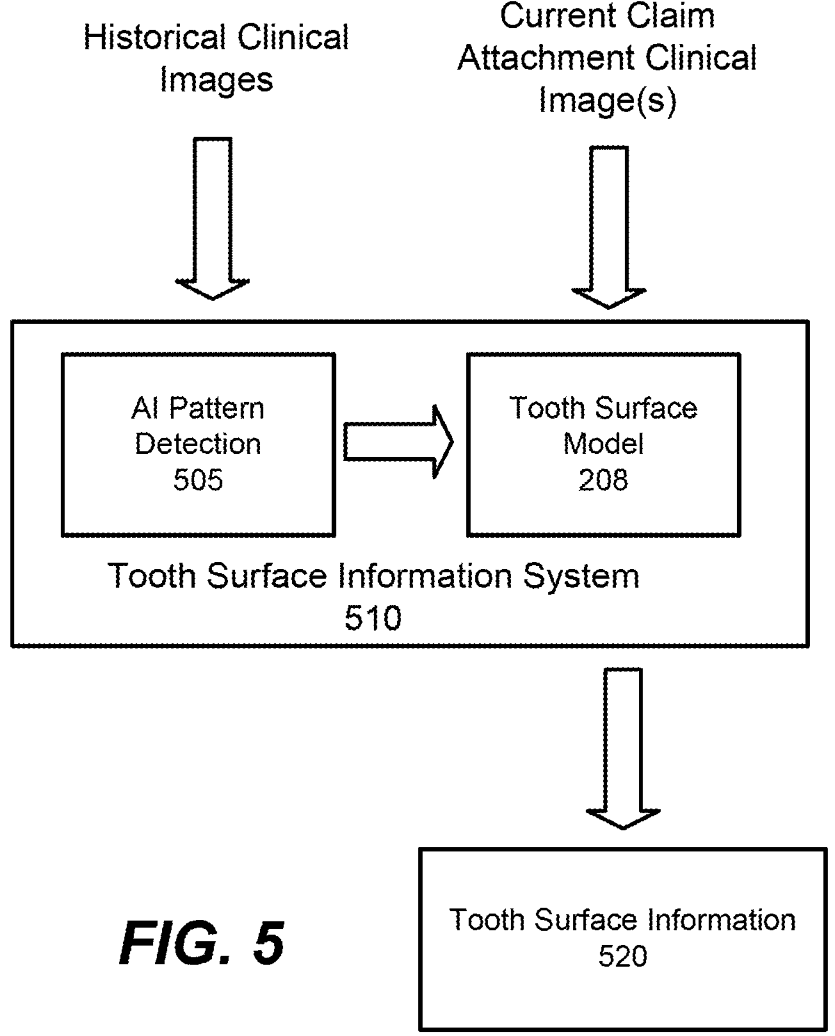
FIG. 5 is a block diagram of an AI based tooth surface information system in accordance with some embodiments of the disclosure.

FIG. 5 is a block diagram that illustrates embodiments of an AI based tooth surface information system 510 in which an AI engine is used to process current dental claim attachment images associated with a patient to predict the number and/or identity of tooth surfaces involved with or affected by a procedure. Clinical dental attachments, such as clinical images, may contain features that provide indicia of one or more teeth including the number and identity of particular surfaces of the one or more teeth involved with or affected by a procedure. The AI engine may include an AI pattern detection module 505 and the tooth surface model 208. The AI pattern detection module 505 may be configured to receive historical clinical images associated with dental examinations of historical patients. During training, the AI pattern detection module 505 may learn associations between features of these clinical images and the one or more teeth affected by a procedure including the number of surfaces of each tooth affected by the procedure and/or the identity of the surfaces of each tooth affected by a procedure. The AI pattern detection module 505 may then generate the tooth surface model 208 based on these learned associations, which can be used to process current clinical images associated with a current patient. The tooth surface information system 510 may generate predicted tooth surface information 520, which may include an identification of one or more teeth affected by a procedure along with the number of tooth surfaces affected by the procedure on each tooth and the identification of the surfaces that are affected by the procedure on each tooth. In addition, the tooth surface information 520 prediction may further include a bounding box identifying the one or more teeth in the clinical image.

Figure 6:
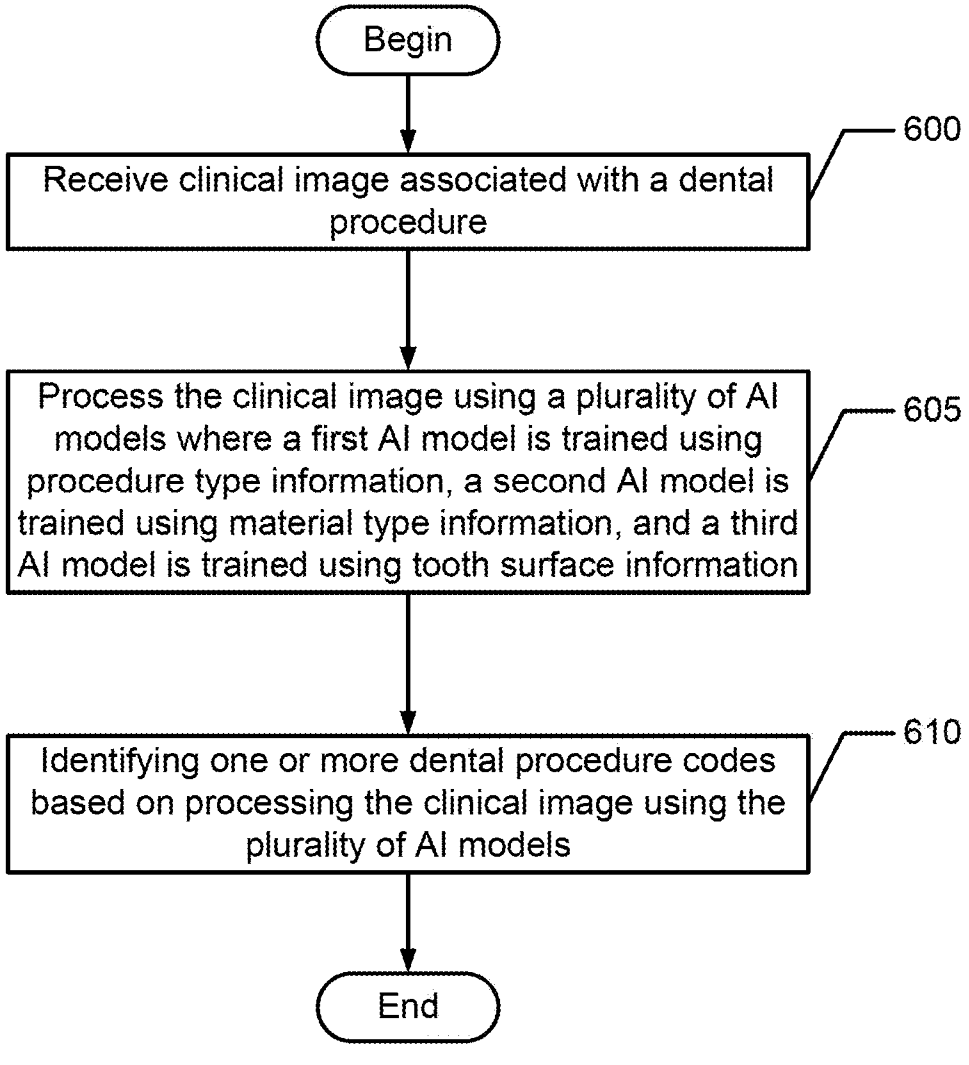
FIGS. 6 and 7 are flowcharts that illustrate operations of the dental procedure code verification system in accordance with some embodiments of the disclosure.
Figure 7:
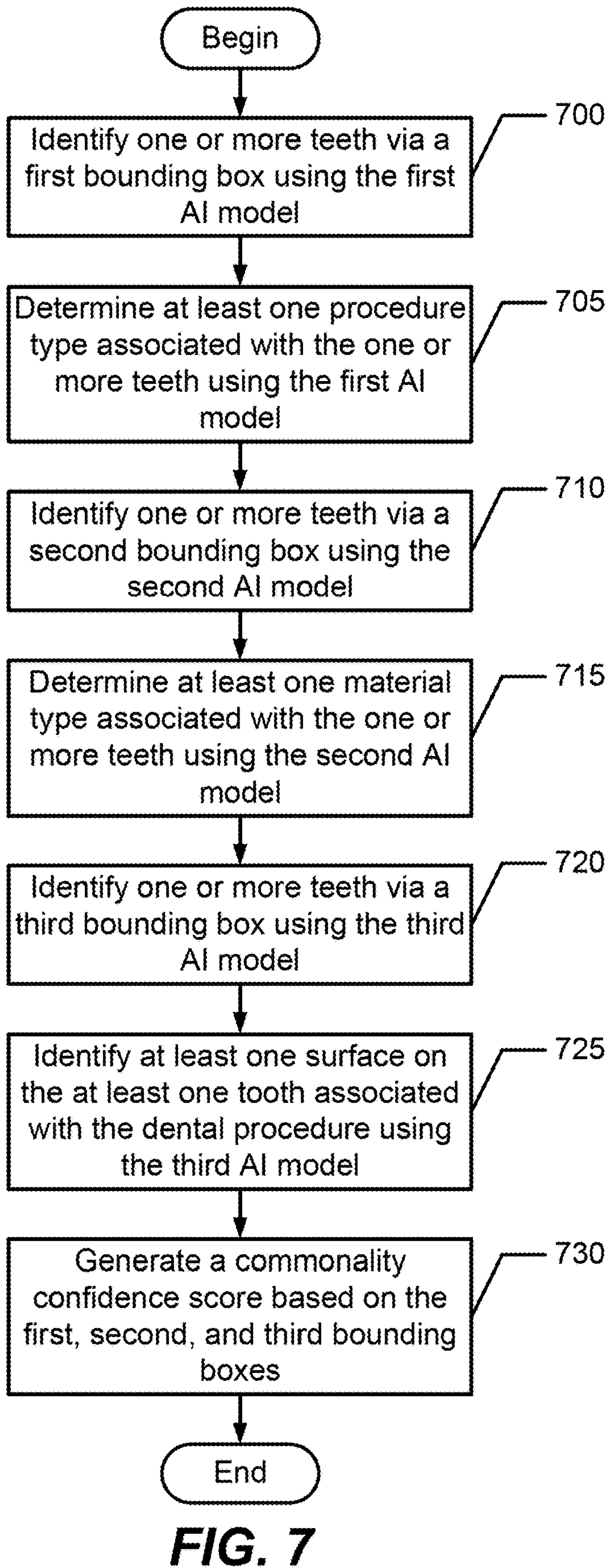

FIGS. 6 and 7 are flowcharts that illustrate operations of the dental procedure code verification system in accordance with some embodiments of the disclosure. Referring now to FIG. 6, operations begin at block 600 where a clinical image associated with a dental procedure is received. The clinical image is processed using a plurality of AI models, which includes a first AI model that is trained using procedure type information, a second AI model that is trained using material type information, and a third AI model that is trained using tooth surface information. One or more dental procedures codes may be identified at block 610 based on processing the clinical image using the plurality of AI models.

Referring now to FIG. 7, operations of the plurality of AI models in processing the clinical image, according to some embodiments of the disclosure, will now be described. Operations begin at block 700 where one or more teeth are identified by a first bounding box using the first AI model. At least one procedure type associated with the one or more teeth is determined or predicted using the first AI model at block 705. At block 710, one or more teeth are identified by a second bounding box using the second AI model. At least one material type associated with the one or more teeth is determined or predicted using the second AI model at block 715. At block 720, one or more teeth are identified by a third bounding box using the third AI model. At least one surface on the at least one tooth associated with a dental procedure is identified or predicted using the third AI model at block 725. A commonality confidence score is generated based on the first, second, and third bounding boxes 730 that is indicative of the degree to which the predictions generated by the first, second, and third AI models pertain to the same tooth or group of teeth.

Figure 8:
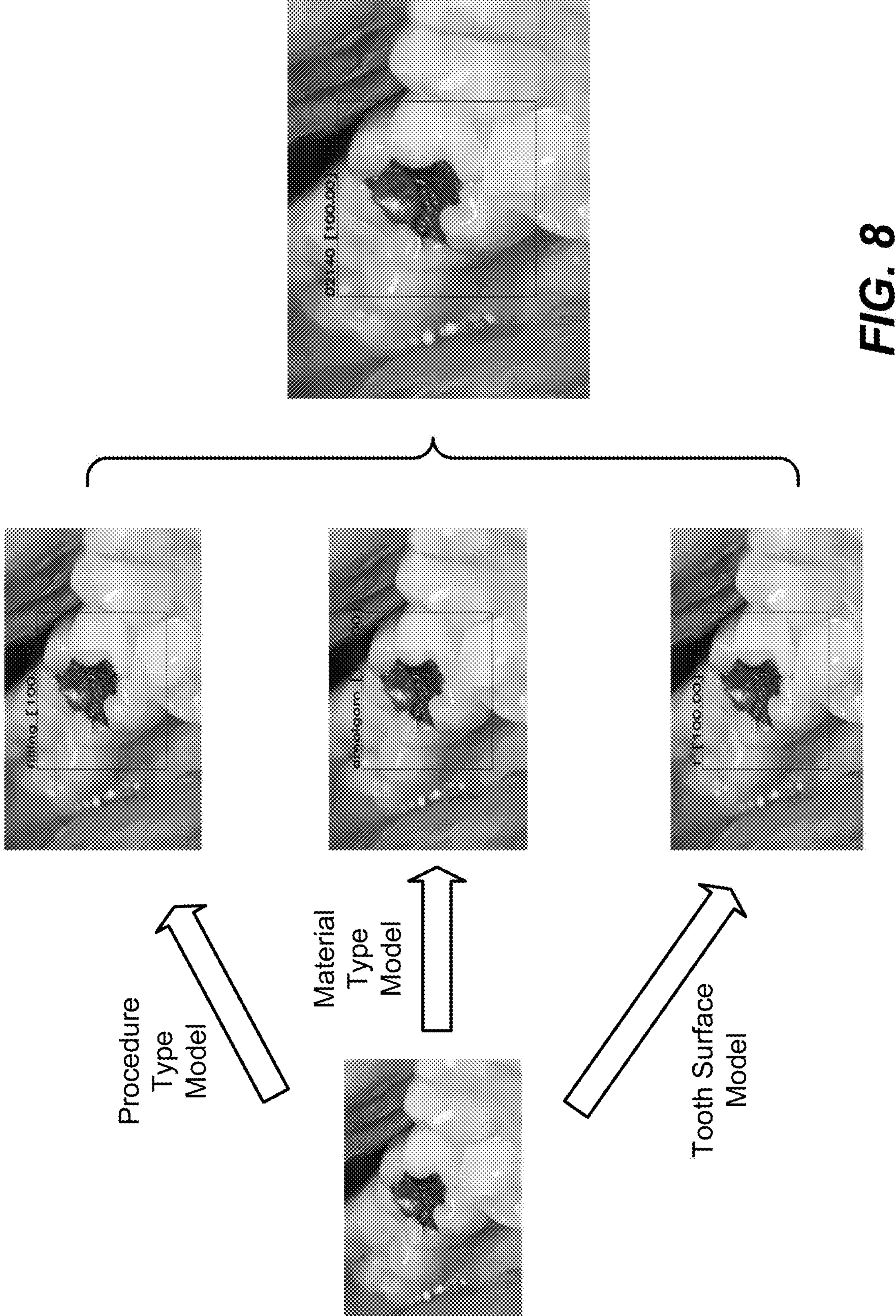
FIG. 8 is a block diagram that illustrates operations of the procedure type AI model, the material type AI model, and the tooth surface AI model of FIGS. 3-5, respectively, in accordance with some embodiments of the disclosure.
Figure 9:
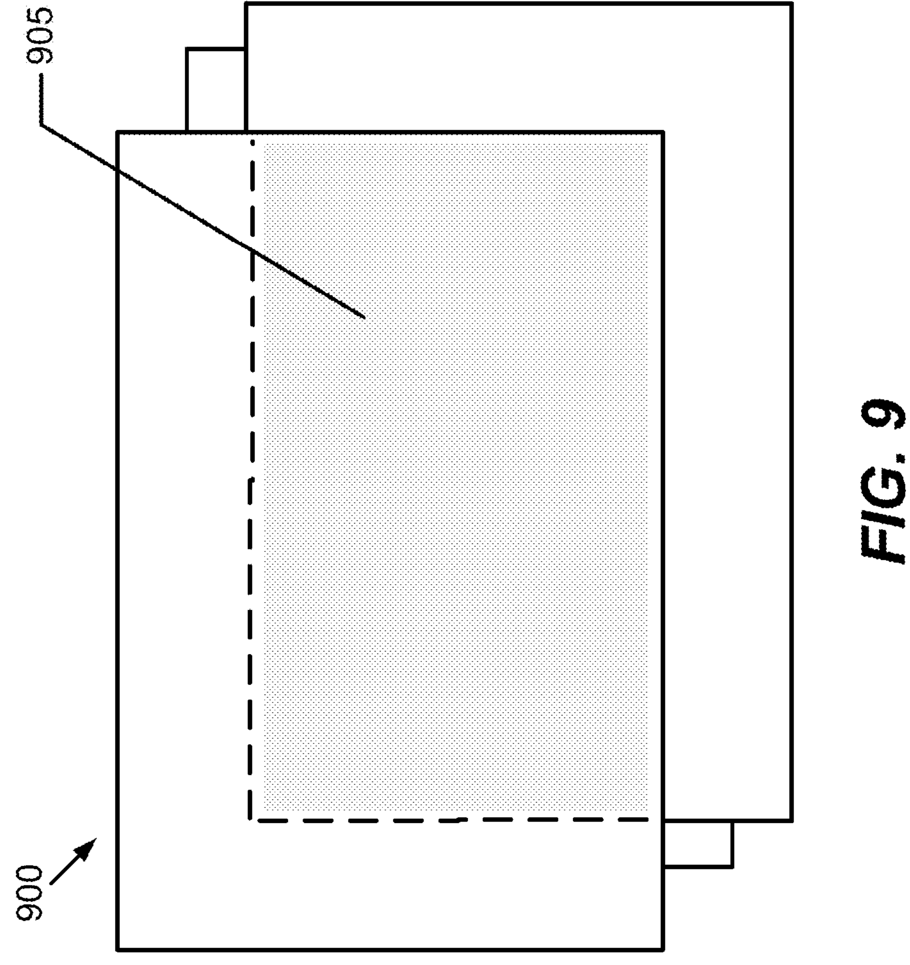
FIG. 9 is a block diagram illustrating an overlay of bounding boxes output from the procedure type AI model, the material type AI model, and the tooth surface AI model of FIGS. 3-5, respectively, in accordance with some embodiments of the disclosure.

Generation of the commonality confidence score may be illustrated by way of example with reference to FIGS. 8 and 9. Referring to FIG. 8, a clinical image is received and independently processed by a procedure type model, a material type model, and a tooth surface model, such as the procedure type model 204, the material type model 206, and the tooth surface model 208 described with reference to FIGS. 2-5. Each of these models outputs a bounding box identifying a tooth on which its prediction is based. To determine whether the tooth identified by the three different models is the same, the bounding boxes can be compared in the manner as shown in FIG. 9 by overlaying the three different bounding boxes over one another to generate a two-dimensional overlay shape 900. An area of common overlap 905 may be determined and a ratio of the area of common overlap 905 to a total surface area of the two-dimensional overlap shape 900 may be determined. The commonality confidence score may be generated based on the ratio. The bounding box overlay technique may effectively bind the predictive outputs of the different AI models together to provide a measure of confidence that the predictive outputs are associated with the same tooth or group of teeth. Returning to FIG. 8, the bounding boxes corresponding to the three different models overlay each other perfectly, such that the ratio of the area of common overlap between the bounding boxes to the total surface area of the two-dimensional overlap shape is one.

Figure 10:
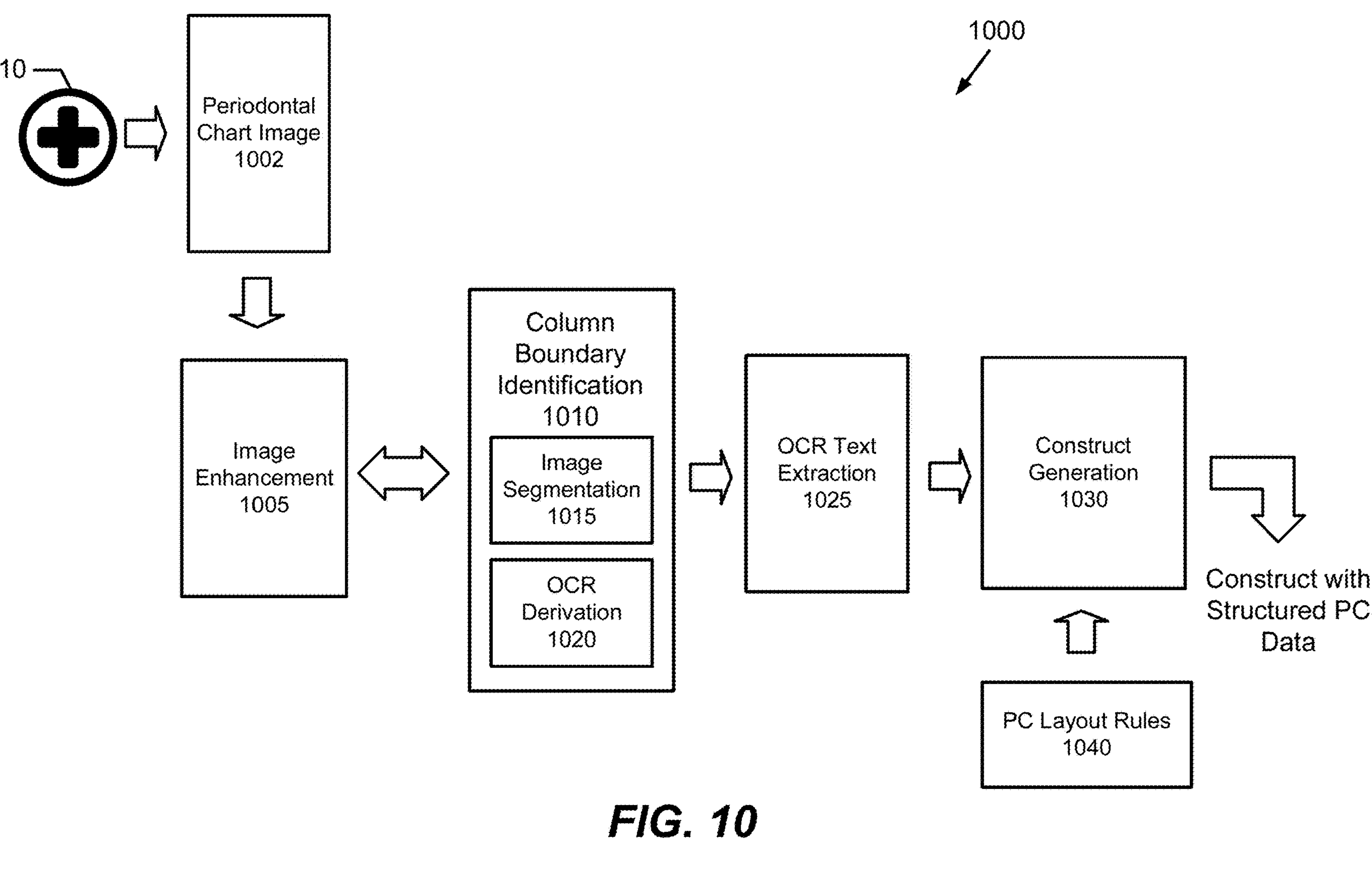
FIG. 10 is a block diagram that illustrates a periodontal chart processing system in accordance with some embodiments of the disclosure.

FIG. 10 is a block diagram that illustrates the periodontal chart processing system in accordance with some embodiments of the inventive concept. As shown in FIG. 10, the periodontal chart processing system 1000 includes a plurality of modules that are coupled in pipeline fashion. A periodontal chart image 1002 may be communicated, for example, from a provider 110 to a payor as part of a claim attachment. The payor may use the periodontal chart processing system, for example, to assist in adjudicating the claim by extracting information from the periodontal chart image 1002 so that it can be stored in a computer-readable construct for further processing and analysis. In some instances, the periodontal chart image 1002 may be a relatively low-quality image, the font sizes may be small, and/or the resolution may be poor. The image enhancement module 1005 may be configured to remove unnecessary or extraneous information from the periodontal chart image, to use image processing technologies to enhance the image by normalizing the background of the periodontal chart image, change one or more of the font colors used in the periodontal chart image (e.g., convert all fonts to black), and/or change one or more font sizes used in the periodontal chart image. The column boundary identification module 210 may receive the enhanced periodontal chart image output from the image enhancement module 1005 and use optical character recognition (OCR) to identify the column boundaries in the periodontal chart image. When the periodontal chart image has discernable column separators (e.g., vertical lines), the image segmentation module 1015 may identify the coordinates of the various columns before processing the periodontal chart using OCR. If the periodontal chart does not have column separators, then the OCR derivation module 1020 may be configured to apply OCR to the periodontal chart to derive the locations of the various columns based on the positioning of text in the periodontal chart. The OCR text extraction module 1025 may then process the periodontal chart to extract teeth, pocket measurement, measurement names, measurement dates, and tooth location (i.e., location on tooth-facial, lingual, or buccal) information from the periodontal chart. The extracted periodontal chart information output from the OCT text extraction module 1025, however, no longer includes the relationships that tie the various items of information together. The construct generation module 1030 may be configured to apply the periodontal chart layout rules 140, which were described above with respect to FIGS. 1 and 13, to generate a computer-readable construct having a specified data format that preserves the relationships between the various types of information extracted from the periodontal chart. In some embodiments, the computer-readable construct having the specified data format may be a JavaScript Object Notation (JSON) string. It will be understood that other types of constructs or data structures may be used in different embodiments of the inventive concept. As an example, a JSON string extracted from a periodontal chart that includes tooth number (tooth 2), location (facial or lingual), no measurement date, and measurement name (PD and CAL) may be constructed as follows: ‘2:{‘F’[“PD:4,3,4’,‘CAL:4, 3,4’], ‘L’:[PD:3,4,4’,‘CAL:3,4,4’]}’. Such a JASON string may then be processed using a computer thereby automating the analysis of the periodontal chart, which may reduce the amount of manual review of the periodontal chart during, for example, claim adjudication by a payor.

Figure 11:
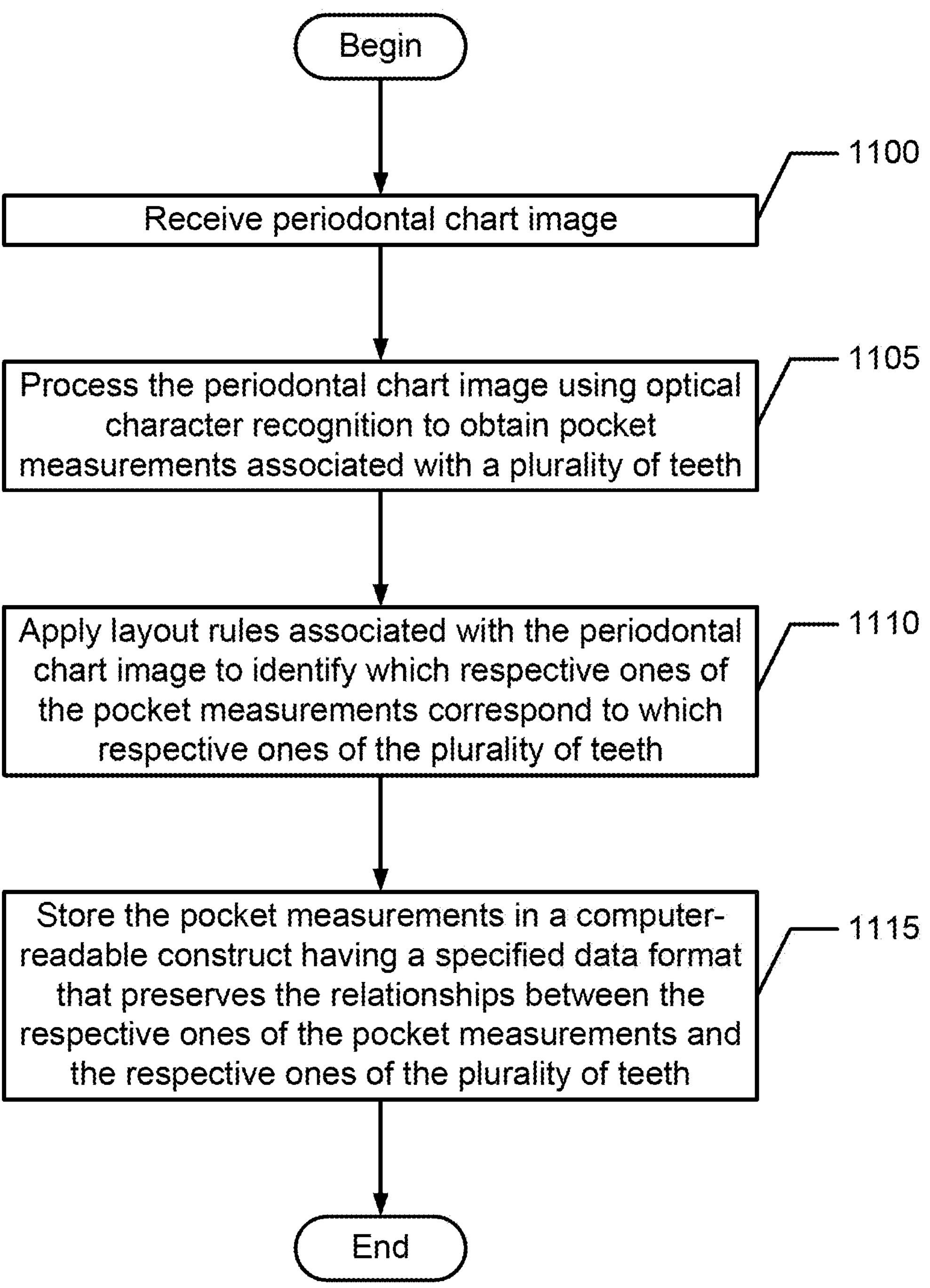
FIGS. 11 and 12 are flowcharts that illustrate operations of the periodontal chart processing system in accordance with some embodiments of the disclosure.
Figure 12:
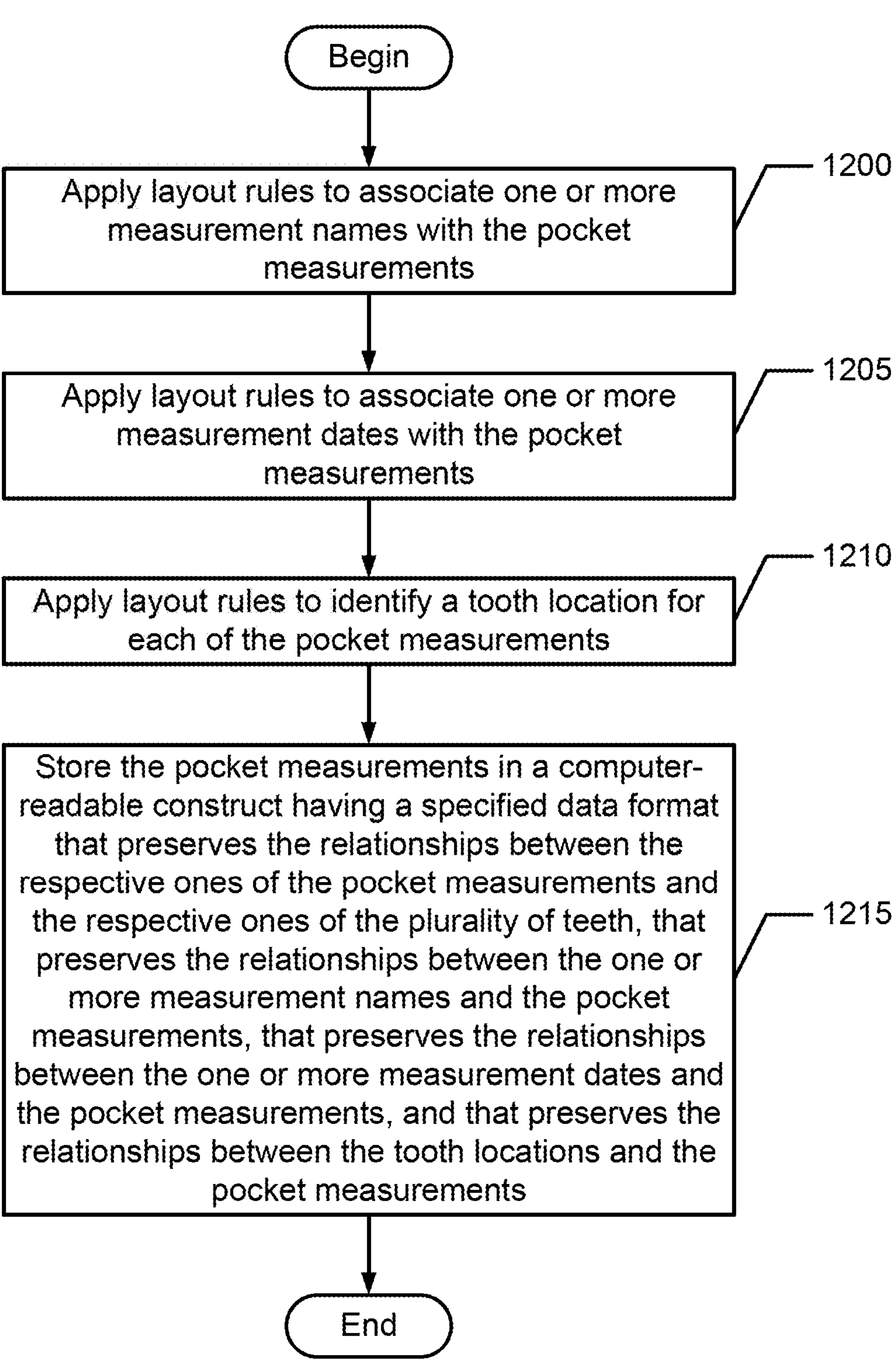

FIGS. 11 and 12 are flowcharts that illustrate operations of the periodontal chart processing system in accordance with some embodiments of the inventive concept. Referring now to FIG. 11, operations begin at block 1100 where a periodontal chart image is received. The periodontal chart image is processed using OCR to obtain pocket measurements associated with a plurality of teeth at block 1105. Layout rules associated with the periodontal chart image are applied at block 1110 to identify which respective ones of the pocket measurements correspond to which respective ones of the plurality of teeth. At block 1115, the pocket measurements are stored in a computer-readable construct having a specified data format that preserves the relationships between the respective ones of the pocket measurements and the respective ones of the plurality of teeth. As described above, a periodontal chart may include additional information, such as, but not limited to, measurement names, measurement dates, tooth location (facial, lingual, or buccal) and the like, which may also be associated with the respective teeth and respective pocket measurements. Thus, referring to FIG. 12, operations begin at block 1200 where the layout rules are applied to associate one or more measurement names with the pocket measurements. At block 1205, the layout rules are applied to associate one or more measurement dates with the pocket measurements. And at block 1210, the layout rules are applied to identify a tooth location for each of the pocket measurements. The pocket measurements may then be stored in a computer readable construct having a specified data format at block 1215 that preserves the relationships between the respective ones of the pocket measurements and the respective ones of the plurality of teeth, that preserves the relationships between the one or more measurement names and the pocket measurements, that preserves the relationships between the one or more measurement dates and the pocket measurements, and that preserves the relationships between the tooth locations and the pocket measurements.

Figure 14:
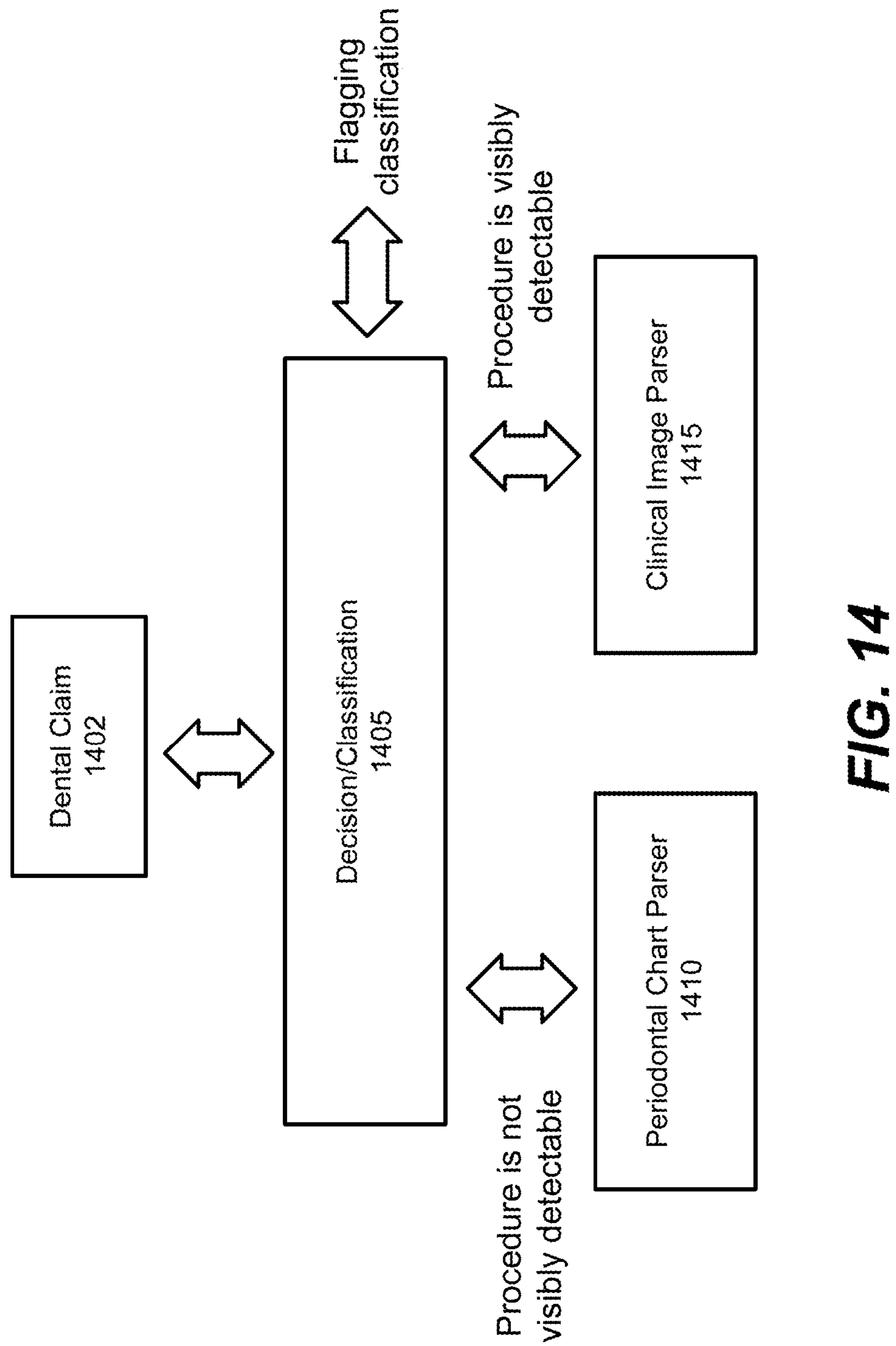
FIG. 14 is a block diagram of a decision support system for predicting whether a dental claim should be flagged according to some embodiments of the disclosure.

FIG. 14 is a block diagram of a decision support system for predicting whether a dental claim should be flagged for further scrutiny according to some embodiments of the disclosure. As described above, when a dental claim is received, the attachments will be analyzed and if the dental claim includes one or more clinical images as an attachment, then the clinical image(s) will be processed the using dental procedure code verification system 200 of FIG. 2. If the dental claim includes a periodontal chart as an attachment, then the periodontal chart will be processed using the periodontal chart processing system 1000 of FIG. 10. The medical necessity verification module 135 of FIG. 1 may include a decision classification module 1405 that is configured to receive the dental claim, which may include one or more procedure codes contained therein identifying procedures that were performed by a medical practitioner. The decision/classification module 1405 may classify these procedure code(s) into two groups: those codes associated with procedures that are visibly detectable, i.e., associated with a procedure that can show a visible exterior change to an affected tooth; and those codes associated with procedures that are not visibly detectable, such as a procedure code for a deep cleaning. When a claim includes a procedure code that is visually detectable, then a determination will be made whether that procedure code was output from a clinical image parser 1415, such as the dental procedure code verification system 200 of FIG. 2 that processes any clinical images attached to the claim. If the procedure code from the claim was not identified through processing of the one or more clinical images 202 using the dental procedure code verification system 200 of FIG. 2, then the decision/classification module 1405 may predict that the claim should be flagged for further scrutiny as it may be suspicious or fraudulent. When a claim includes a procedure code that is not visually detectable, then one or more of the pocket measurements from the processed periodontal chart output from the periodontal chart processing system 1000 of FIG.

10 may be used to evaluate whether a procedure identified in the procedure code in the claim has sufficient evidentiary support to satisfy a medical necessity review. In some embodiments, the maximum pocket depths for one or more of the teeth may be used in the medical necessity evaluation. If the one or more pocket measurements do not satisfy a poor tooth health threshold for the procedure associated with the procedure code in the claim, then the decision/classification module 1405 may flag the claim for further scrutiny as it may be suspicious or fraudulent.

Figure 15:
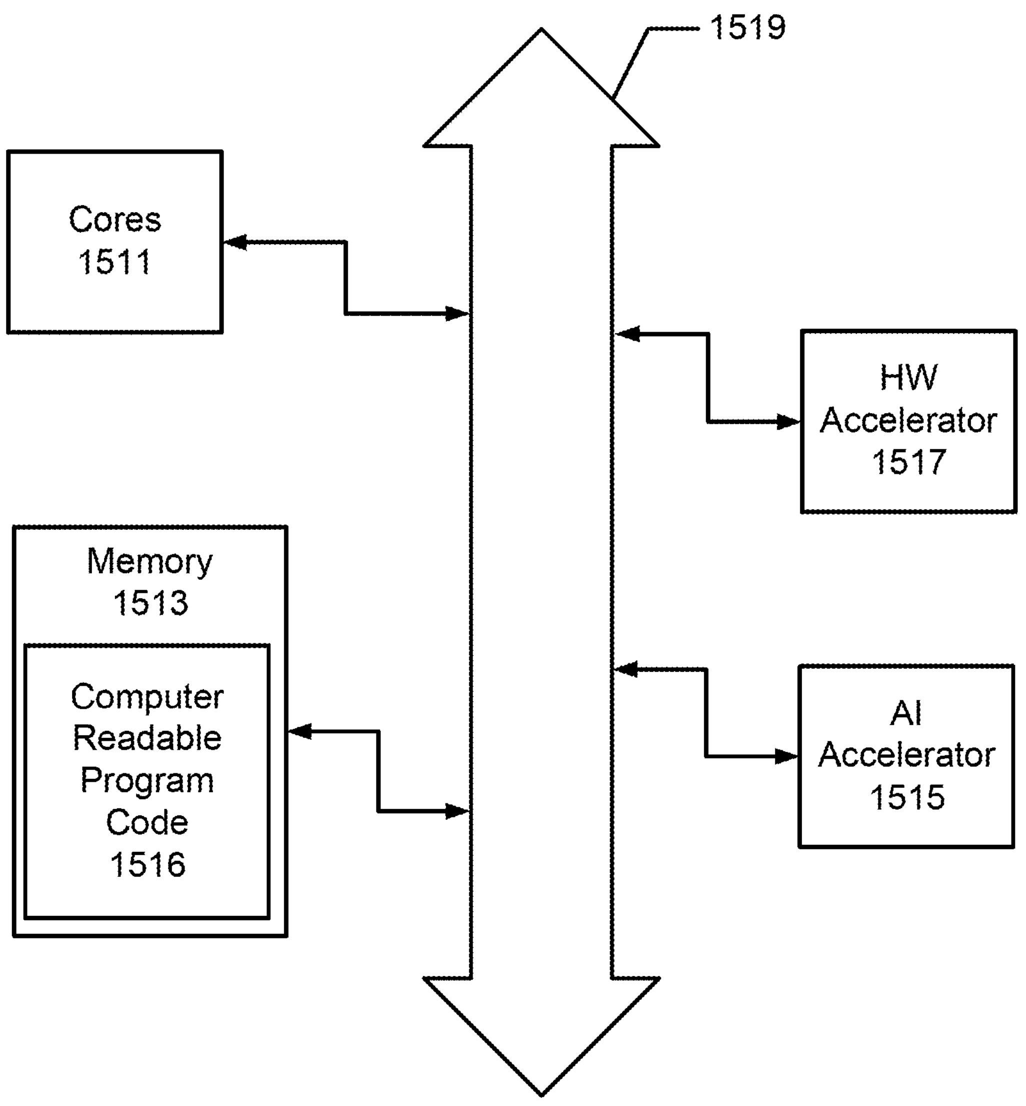
FIG. 15 is a data processing system that may be used to implement a decision support system for predicting whether a dental claim should be flagged in accordance with some embodiments of the disclosure.

FIG. 15 is a block diagram of a data processing system that may be used to implement the decision support system server 104 of FIG. 1. As shown in FIG. 15, the data processing system may include at least one core 1511, a memory 1513, an artificial intelligence (AI) accelerator 1515, and a hardware (HW) accelerator 1517. The at least one core 1511, the memory 1513, the AI accelerator 1515, and the HW accelerator 1517 may communicate with each other through a bus 1519.

The at least one core 1511 may be configured to execute computer program instructions. For example, the at least one core 1511 may execute an operating system and/or applications represented by the computer readable program code 1516 stored in the memory 1513. In some embodiments, the at least one core 1511 may be configured to instruct the AI accelerator 1515 and/or the HW accelerator 1517 to perform operations by executing the instructions and obtain results of the operations from the AI accelerator 1515 and/or the HW accelerator 1517. In some embodiments, the at least one core 1511 may be an Application Specific Instruction Set Processor (ASIP) customized for specific purposes and support a dedicated instruction set.

The memory 1513 may have an arbitrary structure configured to store data. For example, the memory 1513 may include a volatile memory device, such as dynamic random-access memory (DRAM) and static RAM (SRAM), or include a non-volatile memory device, such as flash memory and resistive RAM (RRAM). The at least one core 1511, the AI accelerator 1515, and the HW accelerator 1517 may store data in the memory 1513 or read data from the memory 1513 through the bus 1519.

The AI accelerator 1515 may refer to hardware designed for AI applications. In some embodiments, the AI accelerator 1515 may include a machine learning engine configured to facilitate operations associated with processing dental clinical images using multiple AI models to verify dental procedure codes as described above with respect to FIGS. 2-5. The AI accelerator 1515 may generate output data by processing input data provided from the at least one core 1515 and/or the HW accelerator 1517 and provide the output data to the at least one core 1511 and/or the HW accelerator 1517. In some embodiments, the AI accelerator 1515 may be programmable and be programmed by the at least one core 1511 and/or the HW accelerator 1517. The HW accelerator 1517 may include hardware designed to perform specific operations at high speed. The HW accelerator 1517 may be programmable and be programmed by the at least one core 1511.

Figure 16:
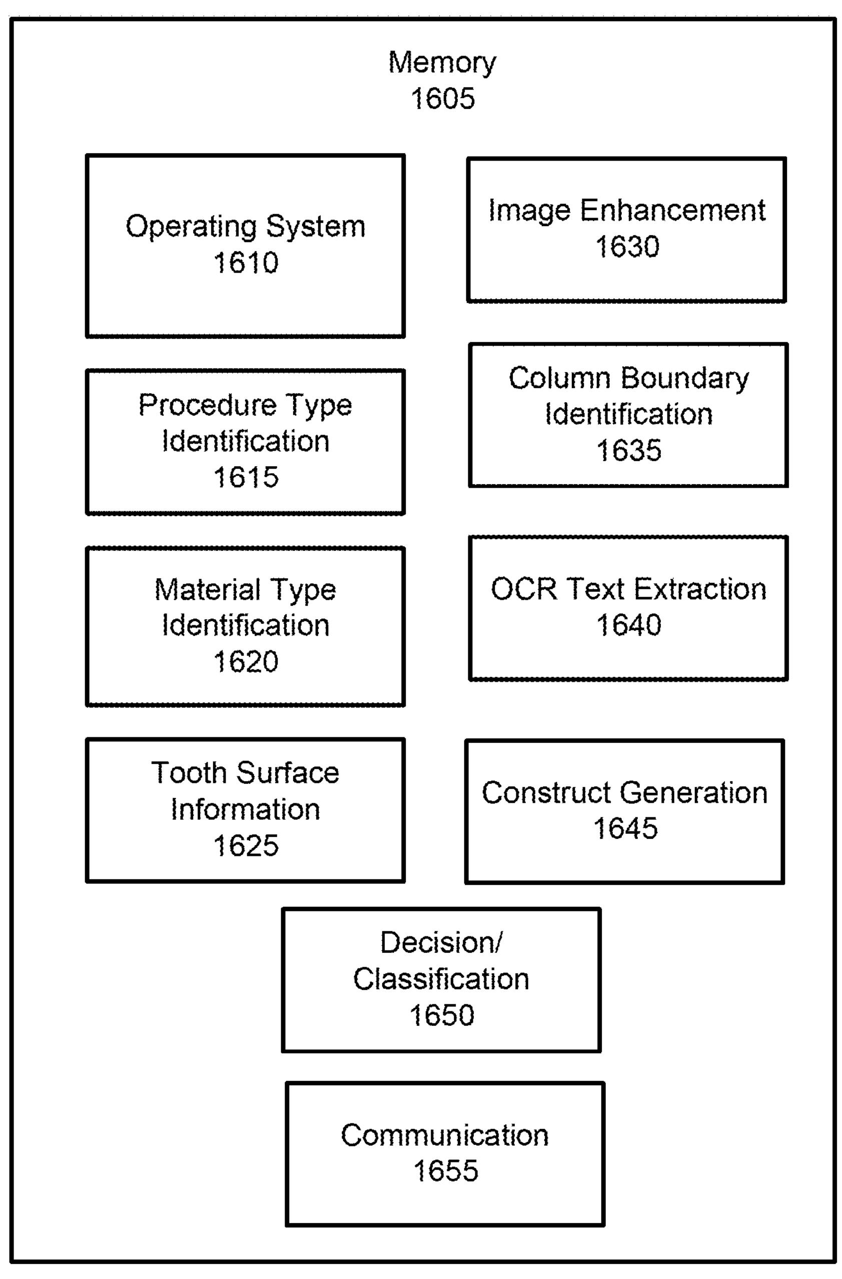
FIG. 16 is a block diagram that illustrates a software/hardware architecture for use in in a decision support system for predicting whether a dental claim should be flagged in accordance with some embodiments of the disclosure.

FIG. 16 illustrates a memory 1105 that may be used in embodiments of data processing systems, such as the decision support system server 104 of FIG. 1 and the data processing system of FIG. 15, respectively, to facilitate operation of a decision support system for flagging a claim for further scrutiny, such as predicting whether a dental claim may be suspicious or fraudulent. The memory 1605 is representative of the one or more memory devices containing the software and data used for facilitating operations of the decision support system server 104 and the medical necessity verification module 135 as described herein. The memory 1605 may include, but is not limited to, the following types of devices: cache, ROM, PROM, EPROM, EEPROM, flash, SRAM, and DRAM. As shown in FIG. 16, the memory 1605 may contain ten or more categories of software and/or data: an operating system 1610, a procedure type identification module 1615, a material type identification module 1620, a tooth surface information module 1620, an image enhancement module 1630, a column boundary identification module 1635, an OCT text extraction module 1640, a construct generation module 1645, a decision/classification module 1650, and a communication module 1130.

In particular, the operating system 1610 may manage the data processing system's software and/or hardware resources and may coordinate execution of programs by the processor. The procedure type identification module 1615 may be configured to perform one or more of the operations described above with respect to the procedure type identification system 310 and the flowcharts of FIGS. 6 and 7. The material type identification module 1620 may be configured to perform one or more of the operations described above with respect to the material type identification system 410 and the flowcharts of FIGS. 6 and 7. The tooth surface information module 1625 may be configured to perform one or more of the operations described above with respect to the tooth surface information system 1625 and the flowcharts of FIGS. 6 and 7. The image enhancement module 1630 may be configured to perform one or more operations described above with respect to the image enhancement module 1005 of FIG. 10 and the flowcharts of FIGS. 11 and 12. The column boundary identification module 1635 may be configured to perform one or more operations described above with respect to the column boundary identification module 1010 of FIG. 10 and the flowcharts of FIGS. 11 and 12. The OCR text extraction module 1640 may be configured to perform one or more operations described above with respect to the OCR text extraction module 1025 of FIG. 10 and the flowcharts of FIGS. 11 and 12. The construct generation module 1645 may be configured to perform one or more operations described above with respect to the construct generation module 1030 of FIG. 10 and the flowcharts of FIGS. 11 and 12. The decision/classification module 1650 may be configured to perform one or more operations described above with respect to the decision/classification module 1405 of FIG. 14. The communication module 1655 may be configured to facilitate communication between the decision support system server 104 and an entity, such as a dental care provider and/or payor.

Although FIG. 16 illustrates hardware/software architectures that may be used in data processing systems, such as the decision support system server 104 of FIG. 1 and the data processing system of FIG. 15, respectively, in accordance with some embodiments of the disclosure, it will be understood that embodiments of the present invention are not limited to such a configuration but is intended to encompass any configuration capable of carrying out operations described herein.

Computer program code for carrying out operations of data processing systems discussed above with respect to FIGS. 1-16 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the decision support system server 104 and the data processing system of FIG. 10 may each be implemented as a single processor system, a multi-processor system, a multi-core processor system, or even a network of stand-alone computer systems, in accordance with various embodiments of the disclosure. Each of these processor/computer systems may be referred to as a "processor" or "data processing system." The functionality provided by the decision support system server 104 may be embodied as a single server or embodied as separate servers in accordance with different embodiments of the disclosure.

The data processing apparatus described herein with respect to FIGS. 1-15 may be used to facilitate operation of a decision support system for flagging a claim, such as predicting whether a dental claim is suspicious or fraudulent according to some embodiments of the disclosure described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 1513 and the memory 1605 when coupled to a processor includes computer readable program code that, when executed by the processor, causes the processor to perform operations including one or more of the operations described herein with respect to FIGS. 1-14.

Some embodiments of the disclosure may provide a multiple AI model framework for evaluating one or more clinical images included as attachments to a dental claim to identify one or more dental procedure codes that may be associated with the clinical images, i.e., the clinical images may provide evidentiary support in a medical necessity review for the one or more procedure codes. The independent AI models may be trained to detect various features of a clinical image including procedure type, material type, and/or tooth surface. Each of the outputs of these models may be accompanied by a bounding box for use in associating the various outputs with the same tooth or teeth. Some procedures identified in a claim require evidentiary support that the procedure has been performed, which may require evidence of one or more of the procedure type (crown, filling, etc.), the material used (gold, amalgam, etc.) and the number of surfaces impacted (e.g., 1-5 for a filling related procedure). An X-ray may only provide evidentiary support for the procedure type due, in part, to the lack of color and spatial information in an X-ray. The use of clinical images may provide improved procedure code identification relative to the use of X-rays for some procedures that require evidentiary support based on the material used and/or the number of tooth surfaces impacted by the procedure. By automating the procedure code identification process through the use of multiple, independent AI models, much of the manual review process in dental claim adjudication can be eliminated, which may improve operational efficiency and lower costs for a payor.

Some embodiments of the disclosure may provide a periodontal chart processing system that can extract the teeth and pocket measurement information contained therein and store this information in a computer-readable construct having a specified data format that preserves the relationships between the pocket measurements and the teeth. This computer-readable construct may then be processed by a computer to automate the manual review of periodontal chart information during claim adjudication by a payor. This may improve the efficiency and accuracy of the claim adjudication process and, as a result, reduce costs for a payor.

Some embodiments of the disclosure may combine aspects of the procedure code verification functionality by processing clinical images and the processed periodontal chart to provide a decision support system that is configured to flag a dental claim for further scrutiny as the dental claim may be suspicious or fraudulent. When a claim includes a procedure code that is visually detectable, then a determination can be made whether that procedure code was output from the AI models processing the one or more clinical images. If the procedure code was not output from the processing of the clinical images, then the decision support system may flag the claim for further scrutiny as the claim may be suspicious or fraudulent. When a claim includes a procedure code that is not visually detectable, then one or more of the pocket measurements from the processed periodontal chart may be used to evaluate whether a procedure identified in the procedure code in the claim has sufficient evidentiary support to satisfy a medical necessity review. In some embodiments, the maximum pocket depths for one or more of the teeth may be used in the medical necessity evaluation. If the one or more pocket measurements do not satisfy a poor tooth health threshold for the procedure associated with the procedure code in the claim, then the decision support system may flag the claim for further scrutiny as the claim may be suspicious or fraudulent. Through use of an AI system to process clinical images to identify procedure codes and conversion of a periodontal chart into a different state, i.e., a computer-readable construct, dental claims may be flagged for further scrutiny with improved speed and accuracy. In some instances, these claims may be suspicious or fraudulent. Moreover, the amount of manual review in adjudicating a dental claim may be reduced.

Some embodiments of the disclosure may provide a decision support system for flagging a dental claim, which may be suspicious or fraudulent, as set forth by the following examples: Example 1: a computer-implemented method comprises: receiving, by one or more processors, a clinical image associated with a dental procedure; processing the clinical image by the one or more processors and a plurality of Artificial Intelligence (AI) models, a first one of the AI models being trained using procedure type information, a second one of the plurality of AI models being trained using material type information, and a third one of the plurality of AI models being trained using tooth surface information; identifying, by the one or more processors, one or more dental procedure codes based on processing the clinical image using the plurality of AI models; receiving, by the one or more processors, a periodontal chart image; processing, by the one or more processors, the periodontal chart image using optical character recognition to obtain pocket measurements associated with a plurality of teeth along with positional coordinates of each of the pocket measurements; applying, by the one or more processors, layout rules associated with the periodontal chart image to identify which respective ones of the pocket measurements correspond to which respective ones of the plurality of teeth; storing, by the one or more processors, the pocket measurements in a computer-readable construct having a specified data format that preserves relationships between the respective ones of the pocket measurements and the respective one of the plurality of teeth; identifying, by the one or more processors, a submitted dental procedure code in a dental claim for the dental procedure; determining, by the one or more processors, whether the submitted dental procedure code corresponds to a visibly detectable procedure; determining, by the one or more processors, whether the submitted dental procedure code matches any of the one or more dental procedure codes based on processing the clinical image when the submitted dental procedure code corresponds to a visibly detectable procedure; and flagging, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

Example 2: the computer-implemented method of Example 1, wherein processing the clinical image using the first one of the AI models comprises: identifying, by the one or more processors, at least one tooth in the clinical image; and determining, by the one or more processors, at least one procedure type associated with the at least one tooth in the clinical image; wherein the at least one procedure type is a crown procedure, a filling procedure, an inlay procedure, or an onlay procedure.

Example 3: the computer-implemented method of any of Examples 1 and 2, wherein processing the clinical image using the second one of the AI models comprises: identifying, by the one or more processors, at least one tooth in the clinical image; and determining, by the one or more processors, at least one material type used in a procedure for the at least one tooth.

Example 4: the computer-implemented method of Example 3, wherein the at least one material type is amalgam, base metal, gold, metallic, noble metal, resin, porcelain, and stainless steel.

Example 5: the computer-implemented method of any of Examples 1-4, wherein processing the clinical image using the third one of the plurality of AI models comprises: identifying, by the one or more processors, at least one tooth in the clinical image; and identifying, by the one or more processors, at least one surface on the at least one tooth associated with the dental procedure.

Example 6: the computer-implemented method of Example 5, wherein processing the clinical image using the plurality of AI models comprises: identifying, by the one or more processors, at least one tooth in the clinical image via a first bounding box using the first one of the AI models; determining, by the one or more processors, at least one procedure type associated with the at least one tooth in the clinical image using the first one of the AI models; identifying, by the one or more processors, at least one tooth in the clinical image via a second bounding box using the second one of the AI models; determining, by the one or more processors, at least one material type used in a procedure for the at least one tooth using the second one of the AI models; identifying, by the one or more processors, at least one tooth in the clinical image via a third bounding box using the third one of the AI models; and identifying, by the one or more processors, at least one surface on the at least one tooth associated with the dental procedure using the third one of the AI models.

Example 7: the computer-implemented method of Example 6, wherein the method further comprises: overlaying, by the one or more processors, the first, second, and third bounding boxes with each other to generate a two-dimensional overlay shape; determining, by the one or more processors, a ratio of an area of common overlap between the first, second, and third bounding boxes to a total surface area of the two-dimensional overlap shape; and generating, by the one or more processors, a commonality confidence score based on the ratio.

Example 8: the computer-implemented method of Example 7, wherein identifying the one or more dental procedure codes based on processing the clinical image using the plurality of AI models comprises: identifying, by the one or more processors, the one or more dental procedure codes based on determining the at least one procedure type using the first one of the AI models, determining the at least one material type using the second one of the AI models, identifying the at least one surface using the third one of the AI models, and the commonality confidence score.

Example 9: the computer-implemented method of any of Examples 1-8, wherein the one or more dental procedure codes comprise one or more Current Dental Terminology (CDT) codes.

Example 10: the computer-implemented method of Examples 1-9, wherein the method further comprises: applying, by the one or more processors, layout rules associated with the periodontal chart image to associate one or more measurement names with the pocket measurements; applying, by the one or more processors, layout rules associated with the periodontal chart image to associate one or more measurement dates with the pocket measurements; and applying, by the one or more processors, layout rules associated with the periodontal chart image to identify a tooth location for each of the pocket measurements; wherein storing the pocket measurements comprises: storing, by the one or more processors, the pocket measurements in a computer-readable construct having the specified data format that preserves the relationships between the respective ones of the pocket measurements and the respective one of the plurality of teeth, that preserves relationships between the one or more measurement names and the pocket measurements, that preserves relationships between the one or more measurement dates and the pocket measurements, and that preserves relationships between the tooth locations and the pocket measurements; wherein the tooth location is facial, lingual, or buccal.

Example 11: the computer-implemented method of Example 10, wherein the layout rules specify that row coordinates are used to differentiate the pocket measurements for different ones of the plurality of teeth; the layout rules specify that the one or more measurement names have similar column coordinates; the layout rules specify that the one or more measurement dates have similar column coordinates; and the layout rules specify that ones of the pocket measurements corresponding to a same one of the plurality of teeth have similar column coordinates.

Example 12: the computer-implemented method of Example 11, wherein the layout rules specify that ones of the pocket measurements corresponding to teeth 1-16 in the facial location are in a first quarter section of the periodontal chart image as defined by column coordinates; the layout rules specify that ones of the pocket measurements corresponding to teeth 1-16 in the lingual location are in a second quarter section of the periodontal chart image as defined by column coordinates; the layout rules specify that ones of the pocket measurements corresponding to teeth 32-17 in the lingual location are in a third quarter section of the periodontal chart image as defined by column coordinates; and the layout rules specify that ones of the pocket measurements corresponding to teeth 32-17 in the facial location are in a fourth quarter section of the periodontal chart image as defined by column coordinates.

Example 13: the computer-implemented method of any of Examples 1-12, wherein the method further comprises: enhancing, by the one or more processors, the periodontal chart image prior to processing the periodontal chart image using optical character recognition; wherein enhancing the periodontal chart image comprises: removing, by the one or more processors, extraneous information from the periodontal chart image; normalizing, by the one or more processors, the background of the periodontal chart image; changing, by the one or more processors, one or more font colors used in the periodontal chart image; or changing, by the one or more processors, one or more font sizes used in the periodontal chart image.

Example 14: the computer-implemented method of any of Examples 1-13, wherein the method further comprises: identifying, by the one or more processors, column boundaries in the periodontal chart image, each of the columns in the periodontal chart image being associated with a unique pair of the plurality of teeth; wherein identifying, by the one or more processors, the column boundaries in the periodontal chart image comprises: identifying, by the one or more processors, the column boundaries in the periodontal chart image using image segmentation when the periodontal chart image includes column separator indicia; and deriving, by the one or more processors, the column boundaries using optical character recognition coordinates when the periodontal chart images does not include column separator indicia.

Example 15: the computer-implemented method of any of Examples 1-14, wherein the computer-readable construct having the specified data format is a JavaScript Object Notation (JSON) string.

Example 16: the computer-implemented method of any of Examples 1-15, wherein the method further comprises: determining, by the one or more processors, whether a maximum one of the pocket measurements satisfies a poor tooth health threshold; and wherein flagging the dental claim when the submitted dental procedure code does not correspond to a visibly detectable procedure comprises: flagging, by the one or more processors, the dental claim when the submitted dental procedure code does not correspond to a visibly detectable procedure and the maximum one of the pocket measurements does not satisfy the poor tooth health threshold.

Example 17: a system comprises: one or more processors; and a memory coupled to the one or more processors and comprising computer readable program code embodied in the memory that is executable by the one or more processors to perform operations comprising: receiving, by the one or more processors, a clinical image associated with a dental procedure; processing the clinical image by the one or more processors and a plurality of Artificial Intelligence (AI) models, a first one of the AI models being trained using procedure type information, a second one of the plurality of AI models being trained using material type information, and a third one of the plurality of AI models being trained using tooth surface information; identifying, by the one or more processors, one or more dental procedure codes based on processing the clinical image using the plurality of AI models; receiving, by the one or more processors, a periodontal chart image; processing, by the one or more processors, the periodontal chart image using optical character recognition to obtain pocket measurements associated with a plurality of teeth along with positional coordinates of each of the pocket measurements; applying, by the one or more processors, layout rules associated with the periodontal chart image to identify which respective ones of the pocket measurements correspond to which respective ones of the plurality of teeth; storing, by the one or more processors, the pocket measurements in a computer-readable construct having a specified data format that preserves relationships between the respective ones of the pocket measurements and the respective one of the plurality of teeth; identifying, by the one or more processors, a submitted dental procedure code in a dental claim for the dental procedure; determining, by the one or more processors, whether the submitted dental procedure code corresponds to a visibly detectable procedure; determining, by the one or more processors, whether the submitted dental procedure code matches any of the one or more dental procedure codes based on processing the clinical image when the submitted dental procedure code corresponds to a visibly detectable procedure; flagging, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

Example 18: the system of Example 17, wherein the operations further comprise: determining, by the one or more processors, whether a maximum one of the pocket measurements satisfies a poor tooth health threshold; and wherein flagging the dental claim when the submitted dental procedure code does not correspond to a visibly detectable procedure comprises: flagging, by the one or more processors, the dental claim when the submitted dental procedure code does not correspond to a visibly detectable procedure and the maximum one of the pocket measurements does not satisfy the poor tooth health threshold.

Example 19, a computer program product comprises: one or more non-transitory computer readable storage media including instructions that, when executed by one or more processors, cause the one or more processors to: receive, by the one or more processors, a clinical image associated with a dental procedure; process the clinical image by the one or more processors and a plurality of Artificial Intelligence (AI) models, a first one of the AI models being trained using procedure type information, a second one of the plurality of AI models being trained using material type information, and a third one of the plurality of AI models being trained using tooth surface information; identify, by the one or more processors, one or more dental procedure codes based on processing the clinical image using the plurality of AI models; receive, by the one or more processors, a periodontal chart image; process, by the one or more processors, the periodontal chart image using optical character recognition to obtain pocket measurements associated with a plurality of teeth along with positional coordinates of each of the pocket measurements; apply, by the one or more processors, layout rules associated with the periodontal chart image to identify which respective ones of the pocket measurements correspond to which respective ones of the plurality of teeth; store, by the one or more processors, the pocket measurements in a computer-readable construct having a specified data format that preserves relationships between the respective ones of the pocket measurements and the respective one of the plurality of teeth; identify, by the one or more processors, a submitted dental procedure code in a dental claim for the dental procedure; determine, by the one or more processors, whether the submitted dental procedure code corresponds to a visibly detectable procedure; determine, by the one or more processors, whether the submitted dental procedure code matches any of the one or more dental procedure codes based on processing the clinical image when the submitted dental procedure code corresponds to a visibly detectable procedure; and flag, by the one or more processors, the dental claim when at least one of the submitted dental procedure code does not match any of the one or more dental procedure codes based on processing the clinical image, the submitted dental procedure code does not correspond to a visibly detectable procedure, or the pocket measurements do not support the submitted dental procedure code.

Example 20: the computer program product of Example 19, wherein the instructions, when executed by the one or more processors, further cause the one or more processors to: determine, by the one or more processors, whether a maximum one of the pocket measurements satisfies a poor tooth health threshold; and wherein flag the dental claim when the submitted dental procedure code does not correspond to a visibly detectable procedure comprises: flag, by the one or more processors, the dental claim when the submitted dental procedure code does not correspond to a visibly detectable procedure and the maximum one of the pocket measurements does not satisfy the poor tooth health threshold.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The description of embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the inventive concept. The aspects of the disclosure herein were chosen and described to best explain the principles of the inventive concept and the practical application, and to enable others of ordinary skill in the art to understand the inventive concept with various modifications as are suited to the particular use contemplated.

What is claimed is:

1. A computer-implemented method, comprising:

receiving, by one or more processors, a clinical image associated with a dental procedure;

processing the clinical image by the one or more processors and a plurality of artificial intelligence (AI) models that includes a first AI model, a second AI model, and a third AI model, wherein:

the first AI model is trained at least in part to associate first features of a first set of historical clinical images with corresponding dental procedure categories or codes;

the second AI model is trained at least in part to associate second features of a second set of historical clinical images with corresponding materials used in dental procedures;

the third AI model is trained at least in part to associate third features of a third set of historical clinical images with corresponding tooth numbers and tooth surfaces involved with or affected by dental procedures; and processing the clinical image comprises:

generating, by the first AI model and based on the clinical image, a predicted procedure type and a first bounding box indicating a first set of one or more teeth associated with the predicted procedure type;

generating, by the second AI model and based on the clinical image, a predicted material type and a second bounding box indicating a second set of one or more teeth associated with the predicted material type;

generating, by the third AI model and based on the clinical image, predicted tooth surface information and a third bounding box indicating a third set of one or more teeth associated with the predicted tooth surface information; and generating a commonality confidence score based on an area of common overlap between the first, second, and third bounding boxes;

determining, by the one or more processors, one or more dental procedure codes based on the predicted procedure type, the predicted material type, the predicted tooth surface information, and the commonality confidence score;

identifying, by the one or more processors, a submitted dental procedure code in a dental claim for the dental procedure; and flagging, by the one or more processors, the dental claim when the submitted dental procedure code does not match any of the one or more dental procedure codes based on processing the clinical image.

2. The computer-implemented method of claim 1, wherein the predicted procedure type is a crown procedure, a filling procedure, an inlay procedure, or an onlay procedure.

3. The computer-implemented method of claim 1, wherein the predicted material type is amalgam, base metal, gold, metallic, noble metal, resin, porcelain, or stainless steel.

4. The computer-implemented method of claim 1, wherein processing the clinical image further comprises:

identifying, by the one or more processors, at least one tooth in the clinical image via the first bounding box using the first AI model;

identifying, by the one or more processors, at least one tooth in the clinical image via the second bounding box using the second AI model;

identifying, by the one or more processors, at least one tooth in the clinical image via the third bounding box using the third AI model; and identifying, by the one or more processors, at least one surface on the at least one tooth associated with the dental procedure using the third AI model.

5. The computer-implemented method of claim 4, wherein generating the commonality confidence score comprises:

overlaying, by the one or more processors, the first, second, and third bounding boxes with each other to generate a two-dimensional overlay shape;

determining, by the one or more processors, a ratio of the area of common overlap between the first, second, and third bounding boxes to a total surface area of the two-dimensional overlay shape; and generating, by the one or more processors, the commonality confidence score based on the ratio.

6. The computer-implemented method of claim 1, wherein the one or more dental procedure codes comprise one or more Current Dental Terminology (CDT) codes.

7. The computer-implemented method of claim 1, further comprising:

receiving, by the one or more processors, a periodontal chart image;

processing, by the one or more processors, the periodontal chart image using optical character recognition to obtain pocket measurements associated with a plurality of teeth along with positional coordinates of each of the pocket measurements;

applying, by the one or more processors, layout rules associated with the periodontal chart image to identify which respective ones of the pocket measurements correspond to which respective ones of the plurality of teeth;

storing, by the one or more processors, the pocket measurements in a computer-readable construct having a specified data format that preserves relationships between the respective ones of the pocket measurements and the respective ones of the plurality of teeth;

determining, by the one or more processors, whether the submitted dental procedure code corresponds to a visibly detectable procedure; and determining, by the one or more processors, whether the submitted dental procedure code matches any of the one or more dental procedure codes based on processing the clinical image when the submitted dental procedure code corresponds to a visibly detectable procedure, wherein flagging the dental claim occurs when (i) the submitted dental procedure code does not match any of the one or more dental procedure codes based on processing the clinical image and (ii) at least one of the submitted dental procedure code does not correspond to a visibly detectable procedure or the pocket measurements do not support the submitted dental procedure code.

8. The computer-implemented method of claim 7, further comprising:

applying, by the one or more processors, the layout rules associated with the periodontal chart image to associate one or more measurement names with the pocket measurements;

applying, by the one or more processors, the layout rules associated with the periodontal chart image to associate one or more measurement dates with the pocket measurements; and applying, by the one or more processors, the layout rules associated with the periodontal chart image to identify a tooth location for each of the pocket measurements, wherein storing the pocket measurements comprises storing the pocket measurements in the computer-readable construct having the specified data format that preserves the relationships between the respective ones of the pocket measurements and the respective ones of the plurality of teeth, that preserves relationships between the one or more measurement names and the pocket measurements, that preserves relationships between the one or more measurement dates and the pocket measurements, and that preserves relationships between the tooth locations and the pocket measurements, and wherein the tooth location is a facial location, a lingual location, or a buccal location.

9. The computer-implemented method of claim 8, wherein:

the layout rules specify that row coordinates are used to differentiate the pocket measurements for different ones of the plurality of teeth;

the layout rules specify that the one or more measurement names have similar column coordinates;

the layout rules specify that the one or more measurement dates have similar column coordinates; and the layout rules specify that ones of the pocket measurements corresponding to a same one of the plurality of teeth have similar column coordinates.

10. The computer-implemented method of claim 9, wherein:

the layout rules specify that ones of the pocket measurements corresponding to a first subset of teeth in the facial location are in a first quarter section of the periodontal chart image as defined by column coordinates;

the layout rules specify that ones of the pocket measurements corresponding to a first subset of teeth in the lingual location are in a second quarter section of the periodontal chart image as defined by column coordinates;

the layout rules specify that ones of the pocket measurements corresponding to a second subset of teeth in the lingual location are in a third quarter section of the periodontal chart image as defined by column coordinates; and the layout rules specify that ones of the pocket measurements corresponding to a second subset of teeth in the facial location are in a fourth quarter section of the periodontal chart image as defined by column coordinates.

11. The computer-implemented method of claim 7, further comprising:

enhancing, by the one or more processors, the periodontal chart image prior to processing the periodontal chart image using optical character recognition, wherein enhancing the periodontal chart image comprises:

removing, by the one or more processors, extraneous information from the periodontal chart image;

normalizing, by the one or more processors, a background of the periodontal chart image;

changing, by the one or more processors, one or more font colors used in the periodontal chart image; or changing, by the one or more processors, one or more font sizes used in the periodontal chart image.

12. The computer-implemented method of claim 7, further comprising:

identifying, by the one or more processors, column boundaries in the periodontal chart image, each column in the periodontal chart image being associated with a unique pair of the plurality of teeth, wherein identifying, by the one or more processors, the column boundaries in the periodontal chart image comprises:

identifying the column boundaries in the periodontal chart image using image segmentation when the periodontal chart image includes column separator indicia; and deriving the column boundaries using optical character recognition coordinates when the periodontal chart image does not include column separator indicia.

13. The computer-implemented method of claim 7, wherein the computer-readable construct having the specified data format is a JavaScript Object Notation (JSON) string.

14. The computer-implemented method of claim 7, further comprising:

determining, by the one or more processors, whether a maximum one of the pocket measurements satisfies a poor tooth health threshold, wherein flagging the dental claim when the submitted dental procedure code does not correspond to a visibly detectable procedure comprises:

flagging, by the one or more processors, the dental claim when the submitted dental procedure code does not correspond to a visibly detectable procedure and the maximum one of the pocket measurements does not satisfy the poor tooth health threshold.

15. A system comprising:

one or more processors; and one or more memories storing processor-executable instructions that, when executed by the one or more processors, cause the one or more processors to perform operations comprising:

receiving a clinical image associated with a dental procedure;

processing the clinical image by a plurality of artificial intelligence (AI) models that includes a first AI model, a second AI model, and a third AI model, wherein:

the first AI model is trained at least in part to associate first features of a first set of historical clinical images with corresponding dental procedure categories or codes;

the second AI model is trained at least in part to associate second features of a second set of historical clinical images with corresponding materials used in dental procedures;

the third AI model is trained at least in part to associate third features of a third set of historical clinical images with corresponding tooth numbers and tooth surfaces involved with or affected by dental procedures; and processing the clinical image comprises:

generating, by the first AI model and based on the clinical image, a predicted procedure type and a first bounding box indicating a first set of one or more teeth associated with the predicted procedure type;

generating, by the second AI model and based on the clinical image, a predicted material type and a second bounding box indicating a second set of one or more teeth associated with the predicted material type;

generating, by the third AI model and based on the clinical image, predicted tooth surface information and a third bounding box indicating a third set of one or more teeth associated with the predicted tooth surface information; and generating a commonality confidence score based on an area of common overlap between the first, second, and third bounding boxes;

determining one or more dental procedure codes based on the predicted procedure type, the predicted material type, the predicted tooth surface information, and the commonality confidence score;

identifying a submitted dental procedure code in a dental claim for the dental procedure; and flagging the dental claim when the submitted dental procedure code does not match any of the one or more dental procedure codes based on processing the clinical image.

16. The system of claim 15, wherein the operations further comprise:

receiving a periodontal chart image;

processing the periodontal chart image using optical character recognition to obtain pocket measurements associated with a plurality of teeth along with positional coordinates of each of the pocket measurements;

applying layout rules associated with the periodontal chart image to identify which respective ones of the pocket measurements correspond to which respective ones of the plurality of teeth;

storing the pocket measurements in a computer-readable construct having a specified data format that preserves relationships between the respective ones of the pocket measurements and the respective ones of the plurality of teeth;

determining whether the submitted dental procedure code corresponds to a visibly detectable procedure; and determining whether the submitted dental procedure code matches any of the one or more dental procedure codes based on processing the clinical image when the submitted dental procedure code corresponds to a visibly detectable procedure, wherein flagging the dental claim occurs when (i) the submitted dental procedure code does not match any of the one or more dental procedure codes based on processing the clinical image and (ii) at least one of the submitted dental procedure code does not correspond to a visibly detectable procedure or the pocket measurements do not support the submitted dental procedure code.

17. The system of claim 16, wherein the operations further comprise:

determining whether a maximum one of the pocket measurements satisfies a poor tooth health threshold, wherein flagging the dental claim when the submitted dental procedure code does not correspond to a visibly detectable procedure comprises:

flagging the dental claim when the submitted dental procedure code does not correspond to a visibly detectable procedure and the maximum one of the pocket measurements does not satisfy the poor tooth health threshold.

18. One or more non-transitory computer-readable media storing processor-executable instructions that, when executed by one or more processors, cause the one or more processors to perform operations comprising:

receiving a clinical image associated with a dental procedure;

processing the clinical image by a plurality of artificial intelligence (AI) models that includes a first AI model, a second AI model, and a third AI model, wherein:

the first AI model is trained at least in part to associate first features of a first set of historical clinical images with corresponding dental procedure categories or codes;

the second AI model is trained at least in part to associate second features of a second set of historical clinical images with corresponding materials used in dental procedures;

the third AI model is trained at least in part to associate third features of a third set of historical clinical images with corresponding tooth numbers and tooth surfaces involved with or affected by dental procedures; and processing the clinical image comprises:

generating, by the first AI model and based on the clinical image, a predicted procedure type and a first bounding box indicating a first set of one or more teeth associated with the predicted procedure type;

generating, by the second AI model and based on the clinical image, a predicted material type and a second bounding box indicating a second set of one or more teeth associated with the predicted material type;

generating, by the third AI model and based on the clinical image, predicted tooth surface information and a third bounding box indicating a third set of one or more teeth associated with the predicted tooth surface information; and generating a commonality confidence score based on an area of common overlap between the first, second, and third bounding boxes;

determining one or more dental procedure codes based on the predicted procedure type, the predicted material type, the predicted tooth surface information, and the commonality confidence score;

identifying a submitted dental procedure code in a dental claim for the dental procedure; and flagging the dental claim when the submitted dental procedure code does not match any of the one or more dental procedure codes based on processing the clinical image.

19. The one or more non-transitory computer-readable media of claim 18, wherein the operations further comprise:

receiving a periodontal chart image;

processing the periodontal chart image using optical character recognition to obtain pocket measurements associated with a plurality of teeth along with positional coordinates of each of the pocket measurements;

applying layout rules associated with the periodontal chart image to identify which respective ones of the pocket measurements correspond to which respective ones of the plurality of teeth;

storing the pocket measurements in a computer-readable construct having a specified data format that preserves relationships between the respective ones of the pocket measurements and the respective ones of the plurality of teeth;

determining whether the submitted dental procedure code corresponds to a visibly detectable procedure; and determining whether the submitted dental procedure code matches any of the one or more dental procedure codes based on processing the clinical image when the submitted dental procedure code corresponds to a visibly detectable procedure, wherein flagging the dental claim occurs when (i) the submitted dental procedure code does not match any of the one or more dental procedure codes based on processing the clinical image and (ii) at least one of the submitted dental procedure code does not correspond to a visibly detectable procedure or the pocket measurements do not support the submitted dental procedure code.

20. The one or more non-transitory computer-readable media of claim 19, wherein the operations further comprise:

determining whether a maximum one of the pocket measurements satisfies a poor tooth health threshold, wherein flagging the dental claim when the submitted dental procedure code does not correspond to a visibly detectable procedure comprises:

flagging the dental claim when the submitted dental procedure code does not correspond to a visibly detectable procedure and the maximum one of the pocket measurements does not satisfy the poor tooth health threshold.

* * * * *